(12) United States Patent
Gan et al.

(10) Patent No.: US 8,054,260 B2
(45) Date of Patent: Nov. 8, 2011

(54) DRIVING METHOD OF STACKED LIGHT MODULATING DEVICE, AND DRIVING DEVICE OF STACKED LIGHT MODULATING DEVICE

(75) Inventors: Taijyu Gan, Kanagawa (JP); Haruo Harada, Kanagawa (JP); Yasunori Okano, Kanagawa (JP); Makoto Gomyou, Kanagawa (JP); Hiroshi Arisawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 908 days.

(21) Appl. No.: 11/384,347

(22) Filed: Mar. 21, 2006

(65) Prior Publication Data
US 2007/0046595 A1 Mar. 1, 2007

(30) Foreign Application Priority Data
Aug. 23, 2005 (JP) ................................. 2005-240607

(51) Int. Cl.
*G09G 3/36* (2006.01)
(52) U.S. Cl. .......................................................... 345/87
(58) Field of Classification Search .................... 345/87, 345/156, 50
See application file for complete search history.

(56) References Cited

U.S. PATENT DOCUMENTS

| | | | | |
|---|---|---|---|---|
| 5,136,406 A | * | 8/1992 | Kato et al. | 349/76 |
| 5,168,380 A | * | 12/1992 | Fergason | 349/79 |
| 5,693,958 A | * | 12/1997 | Torihara et al. | 257/59 |
| 5,877,826 A | * | 3/1999 | Yang et al. | 349/36 |
| 6,803,899 B1 | * | 10/2004 | Masazumi et al. | 345/101 |
| 2005/0030458 A1 | * | 2/2005 | Sasabayashi et al. | 349/129 |
| 2007/0154825 A1 | * | 7/2007 | Tamoto et al. | 430/58.05 |

FOREIGN PATENT DOCUMENTS

| | | |
|---|---|---|
| JP | 10-039323 | 2/1998 |
| JP | A 10-177191 | 6/1998 |
| JP | A 2000-111942 | 4/2000 |
| JP | 2000-206558 | 7/2000 |

OTHER PUBLICATIONS

Office Action issued in JP Application No. 2005-240607 on Jul. 13, 2010 (with English translation).

* cited by examiner

*Primary Examiner* — Amare Mengistu
*Assistant Examiner* — Dennis Joseph
(74) *Attorney, Agent, or Firm* — Oliff & Berridge, PLC

(57) ABSTRACT

A driving method of a stacked light modulating device for recording an image therein, which includes selective reflection layers each having a cholesteric liquid crystal, reflecting light with different wavelengths within a visible range, and being different in a lower threshold value of texture change from a planar to a focal conic texture with respect to an externally applied voltage and an upper threshold value of texture change from the focal conic to a homeotropic texture, and a pair of electrodes disposed outside, includes applying between the pair of electrodes voltages including a voltage V1 and have a same frequency, to select an area exceeding or not exceeding the upper threshold value in each of the selective reflection layers, and applying voltages including a voltage V2 and have a same frequency different from the voltage V1, to select an area exceeding or not exceeding the lower threshold value.

14 Claims, 13 Drawing Sheets

FIG.4
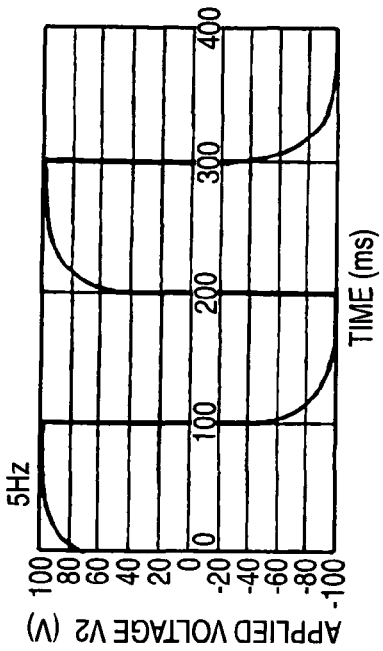
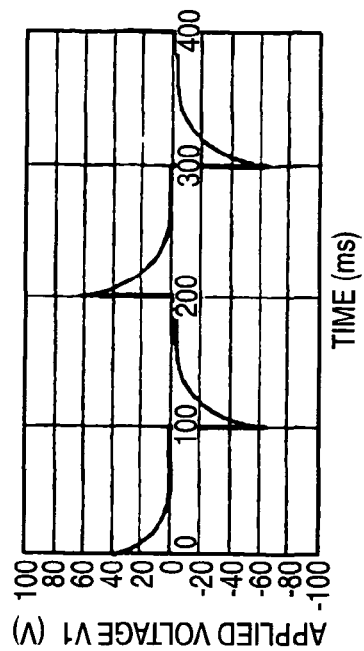
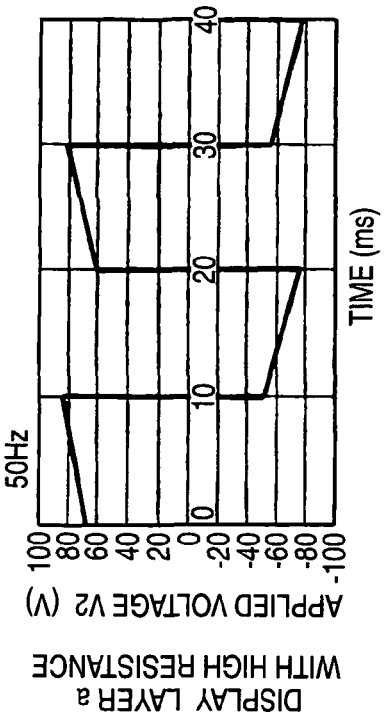
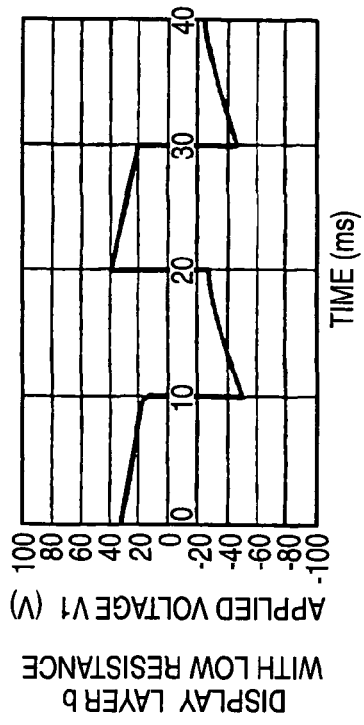

PLANAR

FOCAL CONIC

HOMEOTROPIC

DRIVING METHOD OF STACKED LIGHT MODULATING DEVICE, AND DRIVING DEVICE OF STACKED LIGHT MODULATING DEVICE

BACKGROUND OF THE INVENTION

1. Field of the Invention

The present invention relates to a driving method and a driving device for writing an image in a stacked light modulating device, which contains plural selective reflection layer containing a liquid crystal and displays and records an image of two or more colors.

2. Description of the Related Art

There is increasing expectation of a rewritable marking technique as an alternative to paper as a hardcopy technique due to such reasons as protection of the global environment including forest resources and space saving.

A reflective liquid crystal display device is receiving attention as a display device for a compact information processing equipment and a personal digital assistant since it requires no dedicated light source like aback light, consumes a small amount of electric power, and can be constituted to a thin and small size.

Various techniques using a reflective liquid crystal display device have been proposed for the rewritable marking technique. Among these, the image writing and displaying method, which has been proposed by the inventors, by a threshold value shifting method using a stacked light modulating device provides significant advantages since two display layers can be independently controlled with one driving signal, which simplifies the structure of the medium and reduces the production cost (as described in JP-A-10-177191 and JP-A-2000-111942). Accordingly, the threshold value shifting method provides such a significant advantage that an image of two or more colors including a full-color image can be can be displayed and recorded with a simple manner at low cost.

The principle of the image writing and recording method using the threshold value shifting method will be described below.

FIG. 13 is a schematic cross sectional view showing a state of image writing by the threshold value shifting method. A stacked light modulating device 101 mainly has two display layers 107a and 107b each containing a cholesteric liquid crystal stacked between a pair of transparent electrodes 105 and 106.

A cholesteric liquid crystal having a positive dielectric anisotropy shows the following three states. That is, in a planar texture, the helical axis is perpendicular to the cell surface as shown in FIG. 14A, and the incident light is subjected to the aforementioned selective reflection phenomenon. In a focal conic texture, the helical axis is substantially in parallel to the cell surface as shown in FIG. 14B, and the incident light is transmitted with slightly forward scattering. In a homeotropic texture, the helical structure is unraveled to direct the liquid crystal director to the electric field direction as shown in FIG. 14C, and the incident light is substantially completely transmitted.

Among the three states, the planar texture and the focal conic texture can be bistably present under no electric field. Therefore, the texture state of a cholesteric liquid crystal is not determined unconditionally without the intensity of the electric field applied to the liquid crystal layer, and in the case where a planar texture appears as the initial state, the texture state is changed sequentially to a planar texture, a focal conic texture and a homeotropic texture in this order with increase of the intensity of the electric field, and in the case where a focal conic texture appears as the initial state, the texture state is changed sequentially to a focal conic texture and a homeotropic texture in this order with increase of the intensity of the electric field.

In the case where the intensity of the electric field applied to the liquid crystal layer is decreased suddenly to zero, the planar texture and the focal conic texture maintain the states as they are, and the homeotropic texture is changed to a planar texture.

Therefore, the cholesteric liquid crystal layer immediately after applied with a pulse signal shows a switching behavior as shown in FIG. 15. That is, when the voltage of the pulse signal applied is Vfh, 90 or higher, a selective reflection state where a homeotropic texture is changed to a planar texture appears. When the voltage is from Vpf, 10 to Vfh, 10, a transmission state with a focal conic texture appears. When the voltage is Vpf, 90 or lower, the state before applying the pulse signal is continued, i.e., a selective reflection state with a planar texture or a transmission state with a focal conic texture appears.

In FIG. 15, the ordinate shows the normalized reflectance, which is obtained by normalizing the reflectance with the maximum reflectance as 100 and the minimum reflectance as 0. A transition state appears among the planar texture, the focal conic texture and the homeotropic texture, and therefore, it is determined that the case where the normalized reflectance is 90 or more is designated as the selective reflection state, the case where the normalized reflectance is 10 or less is designated as the transmission state, the threshold voltage of texture transition from the planar texture to the focal conic texture is designated as Vpf, 90 and Vpf, 10 before and after the transition state, respectively, and the threshold voltage of texture transition from the focal conic texture to the homeotropic texture is designated as Vfh, 10 and Vfh, 90 before and after the transition state, respectively.

Particularly, in the PNLC (polymer network liquid crystal) structure or the PDLC (polymer dispersed liquid crystal) structure, in which a polymer is added to a cholesteric liquid crystal, the bistability of a planar texture and a focal conic texture under no electric field is increased with interference at an interface between the cholesteric liquid crystal and the polymer (anchoring effect), whereby the state immediately after applying a pulse signal can be maintained for a long period of time.

In the stacked light modulating device using the technique, (A) the selective reflection state with a planar texture and (B) the transmission state with a focal conic texture are switched independently from the respective layers with only one switching signal, so as to realize color display having a memory effect under no electric field.

In the stacked light modulating device 101 subjected to image writing by the threshold value shifting method, the operation threshold values of the cholesteric liquid crystals of the display layers 107a and 107b are differentiated from each other, whereby arbitrary one or both of the display layers are in a reflection state, or both of them are in a transmission state, depending on a voltage applied between the transparent electrodes 105 and 106.

FIG. 16 is a graph showing a switching behavior of the cholesteric liquid crystals of the display layers 107a and 107b. As shown in FIG. 16, both the cholesteric liquid crystals of the display layers 107a and 107b are changed from a selective reflection state of a planar texture or a transmission state of a focal conic texture to a transmission state of a focal conic texture when the voltage externally applied with an electric power source 117 is increased, and changed from the focal conic texture to a homeotropic texture when the voltage is further increased, and both the liquid crystals are changed to a planar texture when the applied voltage is released.

However, the threshold values (voltages), on which the texture changes occur, are different from each other between the display layer 107a and the display layer 107b, as shown in FIG. 16. That is, the threshold voltage of texture change from a planar texture to a focal conic texture (which is hereinafter referred to as a lower threshold value) is Vpfa for the display layer 107a and Vpfb for the display layer 107b, which is higher than Vpfa of the cholesteric liquid crystal of the display layer 107a. The threshold voltage of texture change from a focal conic texture to a homeotropic texture (which is hereinafter referred to as an upper threshold value) is Vfpa for the display layer 107a and Vfpb for the display layer 107b, which is higher than Vfpa of the cholesteric liquid crystal of the display layer 107a.

In the threshold value shifting method, the display layer 107a and the display layer 107b are independently controlled by utilizing the difference in threshold value.

More specifically, the display layers are selectively applied with a voltage within a range Vc, which is lower than the upper threshold value Vfpb of the display layer 107b but higher than the upper threshold value Vfpa of the display layer 107a, or a voltage within a range Vd, which is higher than the threshold value Vfpb of the display layer 107b, with the electric power source 117. In a part applied with the voltage with the range Vc, the display layer 107b is in a focal conic texture, and the display layer 107a is in a homeotropic texture. In a part applied with the voltage within the range Vd, the display layer 107a is in a homeotropic texture as similar to the part applied with the voltage within the range Vc, but the display layer 107b is changed to a homeotropic texture since the voltage exceeds the upper threshold value Vpfb.

Accordingly, the texture of the display layer 107b can be selected from either a focal conic texture or a homeotropic texture by selecting a voltage applied with the electric power source 117 from either a voltage within the range Vc or a voltage within the range Vd. When the applied voltage is quickly released in this stage, the homeotropic texture is changed to a planar texture, and the focal conic texture is maintained as it is. On the other hand, the display layer 107a is in a homeotropic texture with both the voltages applied before releasing, and the entire display layer 107a is changed to a planar texture by quickly releasing the voltage.

Thereafter, the display layers are selectively applied with a voltage within a range Va, which is lower than the lower threshold value Vpfa of the display layer 107a, or a voltage within a range Vb, which is higher than the lower threshold value Vpfa of the display layer 107a but is lower than the lower threshold value Vfpb of the display layer 107b, with the electric power source 117. In a part applied with the voltage with the range Vb, the display layer 107a undergoes texture change to a focal conic texture since the voltage exceeds the lower threshold value Vpfa, and in a part applied with the voltage within the range Va, the display layer 107a maintains the planar texture state since the voltage does not exceeds the lower threshold value Vpfa. On the other hand, the display layer 107b maintains the planar texture or the focal conic texture, which have been selected with respect to the upper threshold values, since both the applied voltages are lower than the lower threshold value Vfpb.

Consequently, the textures are selected with respect to each part of the display layer 107a to complete the writing operation.

That is, arbitrary one or both of the display layers 107a and 107b can be in a reflection state, or both of them can be in a transmission state, whereby a reflective image is displayed on the display surface. Accordingly, the two display layers can be independently controlled with one driving signal, which simplifies the structure of the medium and reduces the production cost.

There has been such a method as one embodiment of the driving method with the threshold value shifting method that a stacked light modulating device containing a photoconductor layer is used to enable switching by writing with exposure of light. FIG. 17 is a schematic cross sectional view showing a state of image writing by the threshold value shifting method using a stacked light modulating device containing a photoconductor layer. A stacked light modulating device 111 shown in FIG. 17 has two display layers 107a and 107b stacked between a pair of transparent electrodes 105 and 106 as similar to the stacked light modulating device 101 shown in FIG. 13, and further has a photoconductor layer 110 stacked between the display layer 107b and the transparent electrode 106. A colored layer 109 is further disposed between the photoconductor layer 110 and the display layer 107b.

In this embodiment, the entire display layers are applied with a voltage (reset voltage) within a range Vc, which is lower than the upper threshold value Vfpb of the display layer 107b but higher than the upper threshold value Vfpa of the display layer 107a, as a bias voltage with the electric power source 117, and simultaneously, the display layers are selectively exposed, whereby the resistance of the photoconductor layer 110 of the exposed part is changed (lowered) to increase the partial voltage of the display layers 107a and 107b. According to the operation, the voltage applied to the display layers 107a and 107b in the exposed part exceeds the upper threshold value Vpfb. In other words, the exposed part is applied with a voltage within a range Vd, but the non-exposed part is still applied with the voltage within the range Vc. Accordingly, the same selection of texture change of the liquid crystal as in the selective switching operation with intensity of the voltage described with reference to FIG. 13 can be attained by on/off of exposure.

The aforementioned principle of the switching operation can also be applied to the lower threshold values. That is, the entire display layers are applied with a bias voltage within a range Va, which is lower than the lower threshold value Vpfa of the display layer 107a, with the electric power source 117, and simultaneously, the display layers are selectively exposed to select texture change in a part exceeding the lower threshold value Vpfa and a part not exceeding the lower threshold value Vpfa.

Consequently, upon applying a driving method using the threshold value shifting method to a stacked light modulating device containing a photoconductor layer, a voltage determined with respect to the upper threshold values and the lower threshold values is applied to the display layers, and while maintaining the voltage application, the display layers are selectively exposed to accomplish the writing operation.

In order to enhance the operation margin for driving the plural display layers independently by using the threshold value shifting method (which is, in short, the distances in voltage of the upper and lower threshold values between the display layers, i.e., the widths of the ranges Vb and Vc in FIG. 16), it is generally considered to increase the ratio of the operation threshold value and the electric field between the display layers, or to increase the ratio of the electric fields applied to the display layers, which are determined by the dielectric constant and the thickness of the display layer.

However, a cholesteric liquid crystal generally has relationships between the relative dielectric constant and the refractive index anisotropy Δn and between the refractive index anisotropy Δn and the reflectance, and therefore, in the case where the ratio in dielectric resistance between the display layers is increased, it is difficult to obtain sufficient brightness with the display layer having a lower dielectric constant. Furthermore, a cholesteric liquid crystal having such a tendency that the threshold electric field is decreased with increase of the specific dielectric constant, and therefore, the voltages applied to the display layers and the threshold electric fields of the display layers may be reversed to each other, which makes enhancement of the operation margin difficult.

Accordingly, the invention is to provide such a driving method and a driving device of a stacked light modulating device utilizing the threshold value shifting method that enhance the operation margin while maintaining sufficient reflectance in display layers of the stacked light modulating device, so as to realize stable threshold value shifting operation.

SUMMARY OF THE INVENTION

According to an aspect of the present invention, a driving method of a stacked light modulating device for recording an image therein, the stacked light modulating device including a plurality of selective reflection layers each including a cholesteric liquid crystal stacked without an electrode intervening between the selective reflection layers, and a pair of electrodes disposed outside stacked layers, the selective reflection layers each reflecting light with different wavelengths within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, the driving method includes applying between the pair of electrodes a plurality of voltages that are different from each other including a voltage V1 and have a same frequency, to select an area exceeding the upper threshold value or an area not exceeding the upper threshold value in each of the selective reflection layers, and applying between the pair of electrodes a plurality of voltages that are different from each other including a voltage V2 and have a same frequency different in frequency from the voltage V1, to select an area exceeding the lower threshold value or an area not exceeding the lower threshold value in each of the selective reflection layers.

According to another aspect of the present invention, a driving method of a stacked light modulating device for recording an image therein, the stacked light modulating device including a plurality of selective reflection layers each including a cholesteric liquid crystal stacked without an electrode intervening between the selective reflection layers, a photoconductor layer stacked on one side of the stacked layers, and a pair of electrodes disposed outside stacked layers, the selective reflection layers each reflecting light with different wavelengths within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, the driving method includes selectively exposing the stacked light modulating device while applying a voltage V1 between the pair of electrodes, to select an area exceeding the upper threshold value and an area not exceeding the upper threshold value in each of the selective reflection layers, and selectively exposing the stacked light modulating device while applying a voltage V2 different in frequency from the voltage V1 between the pair of electrodes, to select an area exceeding the lower threshold value and an area not exceeding the lower threshold value in each of the selective reflection layers.

In the driving method of a stacked light modulating device of the invention, irrespective to the presence or absence of a photoconductor layer, the voltage V2 preferably has a frequency $F_{V2}$ that is smaller than a frequency $F_{V1}$ of the voltage V1 ($F_{V2} < F_{V1}$), and the frequency $F_{V2}$ is preferably in a range of from 0 to 100 Hz. In the constitution containing a photoconductor layer, the photoconductor layer preferably contains an organic photoconductor.

In the driving method of a stacked light modulating device of the invention, the selective reflection layers may have at least a two-layer structure or may have a three-layer structure, which enables formation of a full color image. The selective reflection layers each preferably contain the cholesteric liquid crystal dispersed in a polymer.

According to still another aspect of the present invention, a driving device of a stacked light modulating device for recording an image therein, the stacked light modulating device including a plurality of selective reflection layers each including a cholesteric liquid crystal stacked without an electrode intervening between the selective reflection layers, and a pair of electrodes disposed outside stacked layers, the selective reflection layers each reflecting light with different wavelengths within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, the driving device includes an electric power source capable of applying a voltage between the pair of electrodes. The driving device executes sequentially a first writing operation of applying between the pair of electrodes a plurality of voltages that are different from each other including a voltage V1 and have a same frequency, to select an area exceeding the upper threshold value or an area not exceeding the upper threshold value in each of the selective reflection layers, and a second writing operation of applying between the pair of electrodes a plurality of voltages that are different from each other including a voltage V2 and have a same frequency different in frequency from the voltage V1, to select an area exceeding the lower threshold value or an area not exceeding the lower threshold value in each of the selective reflection layers.

According to yet another aspect of the present invention, a driving device of a stacked light modulating device for recording an image therein, the stacked light modulating device including a plurality of selective reflection layers each including a cholesteric liquid crystal stacked without an electrode intervening between the selective reflection layers, a photoconductor layer stacked on one side of the stacked layers, and a pair of electrodes disposed outside stacked layers, the selective reflection layers each reflecting light with different wavelengths within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, the driving device includes an electric power source capable of applying a voltage between the pair of electrodes, and an exposing device capable of exposing the stacked light modulating device. The driving device executes sequentially a first writing operation of selectively exposing the stacked light modulating device while applying a voltage V1 between the pair of electrodes, to select an area exceeding the upper threshold value and an area not exceeding the upper threshold value in each of the selective reflection layers, and a second writing operation of selectively exposing the stacked light modulating device while applying a voltage V2 different in frequency from the voltage V1 between the pair of electrodes, to select an area exceeding the lower threshold value and an area not exceeding the lower threshold value in each of the selective reflection layers.

In the driving device of a stacked light modulating device of the invention, irrespective to the presence or absence of a photoconductor layer, the voltage V2 preferably has a frequency $F_{V2}$ that is smaller than a frequency $F_{V1}$ of the voltage V1 ($F_{V2} < F_{V1}$), and the frequency $F_{V2}$ is preferably in a range of from 0 to 100 Hz. In the constitution containing a photoconductor layer, the photoconductor layer preferably contains an organic photoconductor.

In the driving device of a stacked light modulating device of the invention, the selective reflection layers may have at least a two-layer structure or may have a three-layer structure, which enables formation of a full color image. The selective reflection layers each preferably contain the cholesteric liquid crystal dispersed in a polymer.

The functions and advantages of the invention will be described below with reference to the selective reflection layer (display layer) has a two-layer structure as an example.

As shown in the graph of FIG. 2, upon applying a voltage to a stacked light modulating device having a two-layer structure, the operation margins Vm of the display layers (selective reflection layers) are as follows. FIG. 2 is a graph showing switching behavior of the cholesteric liquid crystals of the display layers a and b of the stacked light modulating device used in the invention.

Upon transiting the display layers from a planar texture to a focal conic texture (lower threshold value), a voltage where the normalized reflectance is 90% is designated as Vpf90, a voltage where the normalized reflectance is 50% is designated as Vpf50, and a voltage where the normalized reflectance is 10% is designated as Vpf10. The upper and lower threshold values of the display layer b with larger voltages for the threshold values are attached with a letter "b" before the numerals, and the threshold values of the display layer a with smaller voltages for the threshold values are attached with a letter "a" before the numerals. The operation margin Vm at the lower threshold values can be expressed by the following equation.

$$Vm=2\times(Vpfb90-Vpfa10)/(Vpfb50+Vpfa50)$$

Similarly, upon transiting the display layers (selective reflection layers) from a focal conic texture to a homeotropic texture (upper threshold value), a voltage where the normalized reflectance is 90% is designated as Vfh90, a voltage where the normalized reflectance is 50% is designated as Vfh50, and a voltage where the normalized reflectance is 10% is designated as Vfh10, with letters "a" and "b" being attached in the similar manner as above. The operation margin Vm at the upper threshold values can be expressed by the following equation.

$$Vm=2\times(Vfhb10-Vfha90)/(Vfhb50+Vfha50)$$

These operation margins are preferably positive values. In the case where the display layers are constituted by a cholesteric liquid crystal having a positive dielectric anisotropy, there is such a tendency that the operation margin of the lower threshold value is smaller than the operation margin of the upper threshold value. Therefore, the operation margin of the lower threshold value is firstly considered.

FIG. 3 is a diagram showing an equivalent circuit of the display layers a and b stacked on each other of the stacked light modulating device used in the invention. Ca and Ra represents the equivalent electrostatic capacitance and the equivalent resistance of the display layer a with smaller voltages for the threshold values, and Cb and Rb represents the equivalent electrostatic capacitance and the equivalent resistance of the display layer a with larger voltages for the threshold values.

In order to enhance the ratio of electric fields applied to the display layers a and b, it is considered that the ratio of the dielectric constants of the display layers a and b is increased to increase the capacitance partial voltage ratio. As having been described, however, there is generally a positive relation between the specific dielectric constant and the refractive index anisotropy Δn of a cholesteric liquid crystal, whereby a bright displayed image is difficult to obtain on the display layer with a low dielectric constant (display layer a in this case), and there is generally such a tendency where the threshold electric field is decreased upon increasing the dielectric constant of a liquid crystal material, whereby the threshold electric field of the display layer with a high dielectric constant (display layer b in this case), which makes enhancement of the operation margin difficult.

It is considered that orientation change from a planar texture to a focal conic texture at the lower threshold value is caused by accumulation of electric field energy applied to the display layer containing a cholesteric liquid crystal. The inventors have found that the aforementioned problems can be solved by such a manner that the specific resistances of the liquid crystal materials are differentiated from each other, and voltage pulses having a low frequency relaxing the partial voltage ratio applied to the display layers from the capacitance partial voltage ratio to the resistance partial voltage ratio are applied (i.e., the proportion depending on the resistance partial voltage ratio is increased).

In other words, the voltage is divided by utilizing the resistance ratio between the display layers to eliminate necessity of a large dielectric constant ratio between the liquid crystal materials of the display layers, where by a liquid crystal material having a large refractive index anisotropy Δn can be used in the display layers to obtain a bright displayed image. Furthermore, the threshold electric fields of the display layers can be prevented from being reversed to each other by suppressing the dielectric constant ratio, whereby the operation margin can be easily enhanced. The pulse waveform applied may be a square wave, but an upward triangular wave, a sine wave and direct current pulses providing larger influence of the resistance component are preferably used.

FIG. 4 includes graphs showing the fact that application of voltage pulses with a low frequency provides relaxation to resistance partial voltage ratio to enhance the partial voltage ratio. In FIG. 4, the two graphs on the upper row show the transition of the partial voltage Va of the display layer a with a high resistance, and the two graphs on the lower row show the transition of the partial voltage Vb of the display layer b with a low resistance. In upper and lower rows, the graphs on the left side are the cases where a pulse wave having a frequency of 50 Hz is applied, and the graphs on the right side are the case where a pulse wave having a frequency of 5 Hz is applied. The length per unit time on the abscissa in the graphs with a frequency of 50 Hz is 10 times that in the graphs with a frequency of 5 Hz.

The resistances of the layers are also adjusted to attain the invention, i.e., the liquid crystal materials are selected to provide a high resistance for the display layer a and a low resistance for the display layer b.

Upon applying a pulse wave with a frequency of 50 Hz, the shape of the pulse wave undergoes linear transition while there is a tendency of increase or decrease per the respective pulses, as shown in the graphs on the left side. Upon applying a pulse wave with a frequency of 5 Hz, on the other hand, the shape of the pulse wave undergoes such a tendency of increase or decrease per the respective pulses that continues until saturation, whereby the partial voltage ratio between the display layer a and the display layer b is largely enhanced, as shown in the graphs on the right side.

It is understood therefore that, with respect to the operation margin for the lower threshold values, the relaxation time constant from the capacitance partial voltage ratio to the resistance partial voltage ratio of the voltages applied to the display layers is lowered, and pluses having a frequency and waveform providing large influence of the resistance component are applied to utilize the resistance ratio of the layers, whereby the restriction in dielectric constant is reduced to increase significantly the degree of freedom on designing the liquid crystal materials.

In the case where voltage pulses with a waveform utilizing relaxation to the resistance component (low frequency) are applied, however, turbulence occurs in waveform due to a residual potential after completing application of the final pulse. FIG. 5 is a graph showing the relationship between the applied voltage and the time, in which the turbulence occurs in waveform. A pulse with turbulence in waveform is applied due to influence of the residual potential after the completion of voltage application (at 400 ms in the graph). The turbulence in waveform impairs orientation change from a homeotropic texture to a planar texture to decrease the reflectance, whereby the switching operation at the upper threshold value is hindered.

As having been described, there is such a tendency that the operation margin at the upper threshold value easily becomes larger than the operation margin at the lower threshold value, and thus the device can be operated with the capacitance partial voltage even when the dielectric constant ratio is relatively small. In the invention, the writing operation at the upper threshold value is differentiated in frequency of the applied voltage from the writing operation at the lower threshold value, so as to solve the problems. In the aforementioned embodiment, the frequency of the applied voltage is made small for securing the operation margin at the lower threshold value to attain relaxation to the resistance partial voltage ratio, and on the other hand, the frequency is increased in the switching operation at the upper threshold value, which is liable to receive influence of turbulence in waveform caused by a voltage of a s low frequency, whereby the operation margin is secured with maintaining stable operation.

The frequencies of the applied voltages may be reversed each other depending on various properties of the stacked light modulating device used. The substantial feature of the invention is that the frequencies of the applied voltages, which have been the same as each other with no idea of differentiating from each other, are differentiated between the writing (switching) operation at the upper threshold value and that at the lower threshold value, which realizes sufficient operation margins and stable operation, and enhances the degrees of freedom in drive design, equipment design and device design of the stacked light modulating device, such as the material design of the device.

In a preferred embodiment, a conventional wavelength utilizing the capacitance partial voltage, i.e., a voltage with a high frequency, is applied at the upper threshold value, and a wavelength utilizing the resistance partial voltage, i.e., a voltage with a low frequency, is applied at the lower threshold value. According to the operation, voltages with different frequencies (or different waveforms) are applied as a voltage applied at the upper threshold value (reset voltage) and a voltage applied at the lower threshold value (select voltage), respectively, whereby the stacked light modulating device can be operated with a display layer having a high reflectance realized, and therefore the practicality of the stacked light modulating device using the threshold value shifting method is significantly improved.

With respect to the frequencies of the applied voltages that are differentiated from each other between the first writing step and the second writing step, which are the characteristic features of the invention, the frequency $F_{V2}$ of the applied voltage V2 in the second writing step (switching at the lower threshold value) is preferably in a range of from 0 to 100 Hz, and more preferably in a range of from 0 to 30 Hz. In the case where the frequency $F_{V2}$ exceeds 100 Hz, it is not preferred since there are some cases where relaxation to the resistance partial voltage ratio becomes insufficient to make secure of the operation margin difficult.

According to the invention, such a driving method and a driving device of a stacked light modulating device utilizing the threshold value shifting method can be provided that enhance the operation margin while maintaining sufficient reflectance in display layers of the stacked light modulating device, so as to realize stable threshold value shifting operation.

BRIEF DESCRIPTION OF THE DRAWINGS

FIG. 4 includes graphs showing the fact that application of voltage pulses with a low frequency provides relaxation to resistance partial voltage ratio to enhance the partial voltage ratio;

FIGS. 14A to 14C are schematic diagrams showing the relationship between a molecular orientation of a cholesteric liquid crystal and optical characteristics thereof, in which FIG. 14A is in a planar phase, FIG. 14B is in a focal conic phase, and FIG. 14C is in a homeotropic phase;

DETAILED DESCRIPTION OF THE INVENTION

The invention will be described in detail with reference to the drawings.

First Embodiment

Figure 1:
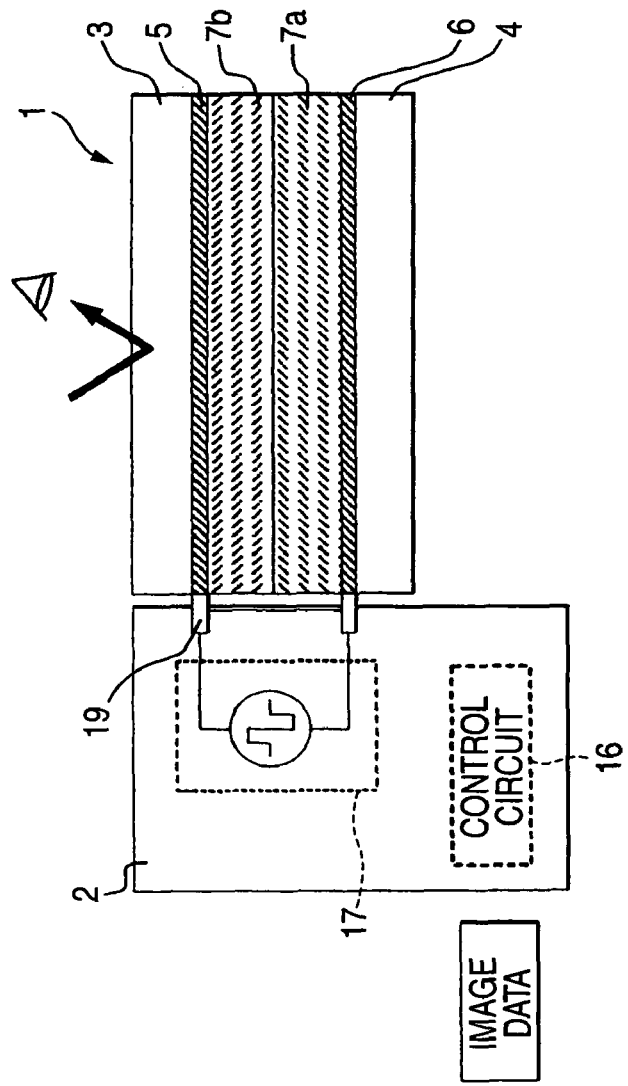
FIG. 1 is a schematic constitutional view showing a first embodiment as one exemplary embodiment of a system, to which the driving method of a stacked light modulating device of the invention.
Figure 2:
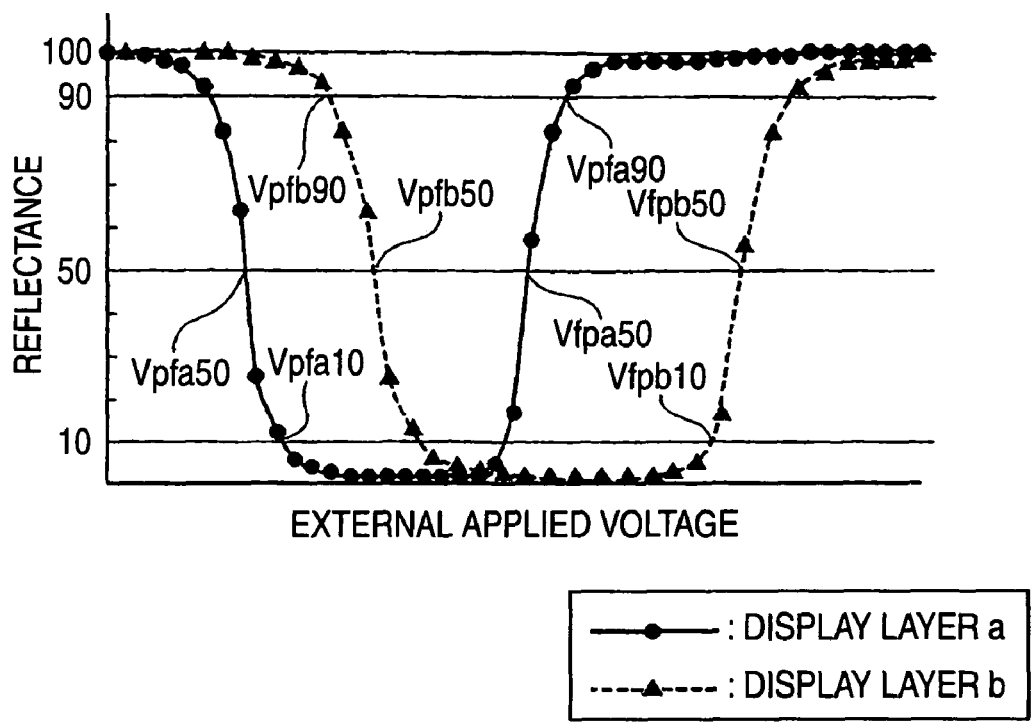
FIG. 2 is a graph showing switching behavior of cholesteric liquid crystals of display layers of a stacked light modulating device used in the invention.
Figure 3:
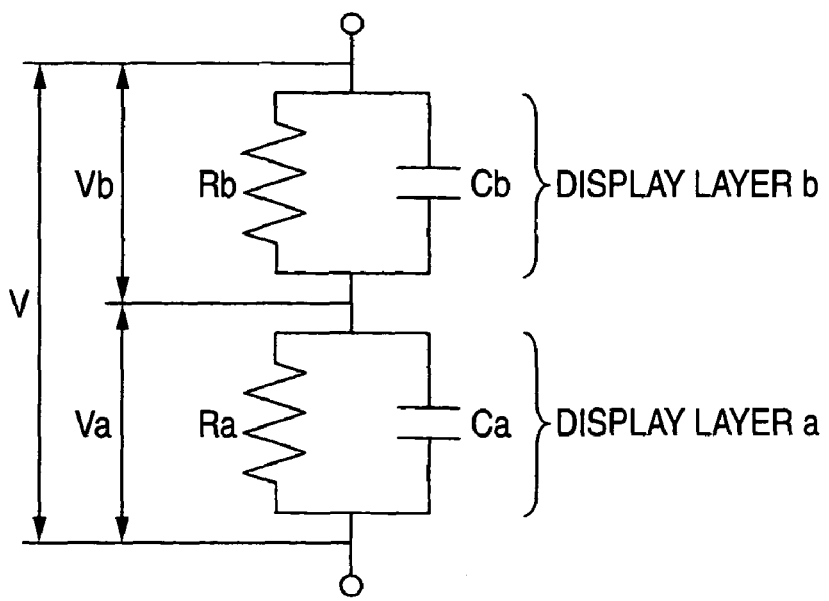
FIG. 3 is a diagram showing an equivalent circuit of display layers stacked on each other of a stacked light modulating device used in the invention.
Figure 5:
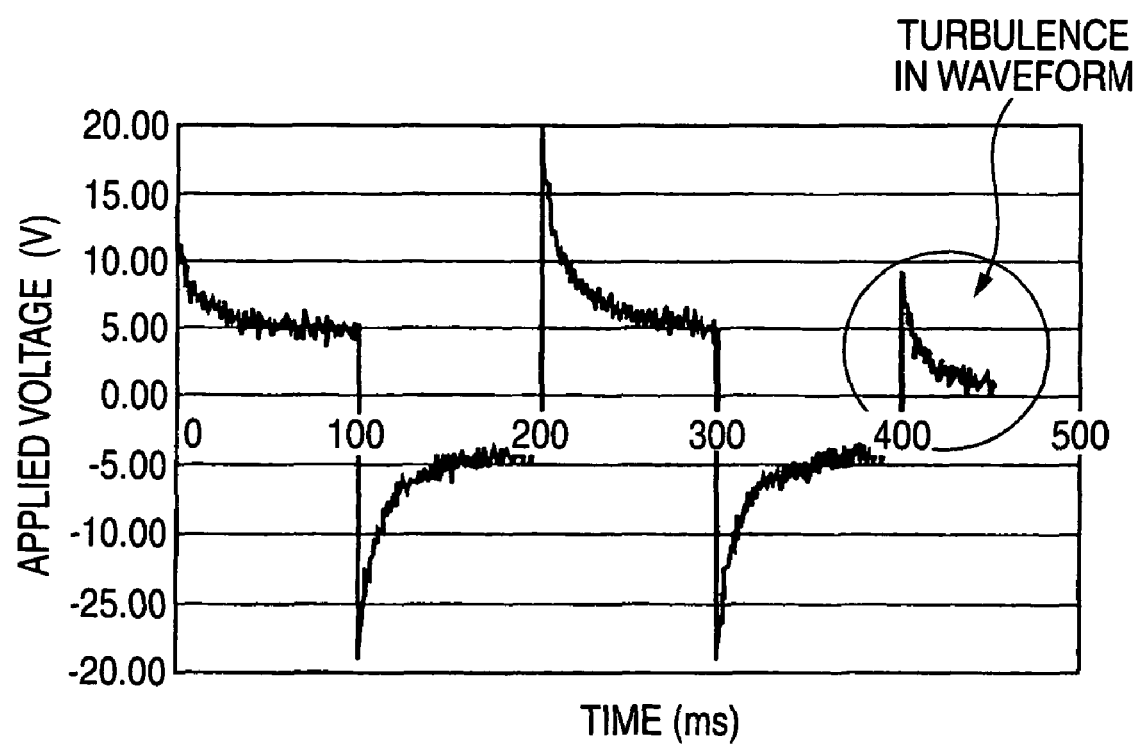
FIG. 5 is a graph showing the relationship between the applied voltage and the time upon applying voltage pulses with a low frequency, in which the turbulence occurs in waveform.

FIG. 1 is a schematic constitutional view showing a first embodiment as one exemplary embodiment of a system, to which the driving method of a stacked light modulating device of the invention. The system according to the embodiment contains a display medium (stacked light modulating device) 1 and a writing device (a driving device of a stacked light modulating device) 2. Both the constitutional elements will be firstly described, and then the operation thereof will be described.

(Display Medium)

The display medium in the embodiment is such a member that can be selectively driven with plural liquid crystal layer (selective reflection layers) by applying a bias signal, and is specifically a stacked light modulating device.

The display medium 1 of the embodiment has, stacked from a display surface in this order, a transparent substrate 3, a transparent electrode 5, a display layer (selective reflection layer) 7b, a display layer (selective reflection layer) 7a, a transparent electrode (electrode) 6 and a transparent substrate 4.

(Transparent Substrate)

The transparent substrates 3 and 4 are such members that retain the functional layers inside to maintain the structure of the display medium. The transparent substrates 3 and 4 each is a member in a sheet form having strength capable of withstanding an external force, and a function of transmitting incident light. The substrates preferably have flexibility. Specific examples of the material of the substrate include an inorganic sheet (such as glass and silicon), and a polymer film (such as polyethylene terephthalate, polysulfone, polyether sulfone, polycarbonate and polyethylene naphthalate). The substrate may have formed on the outer surface thereof a known functional film, such as an antifouling film, an anti-wear film, an antireflection film and a gas barrier film.

(Transparent Electrode)

The transparent electrodes 5 and 6 are such members that plane-uniformly apply a bias voltage applied from the writing device 2 to the functional layers of the light addressing device. The transparent electrodes 5 and 6 have plane-uniform electroconductivity, and transmit incident light and addressing light. Specific examples thereof include electroconductive thin films formed of a metal (such as gold and aluminum), a metallic oxide (such as indium oxide, tin oxide and indium tin oxide (ITO)), and an electroconductive organic s polymer (such as a polythiophene polymer and a polyaniline polymer). The transparent electrode may have formed on the surface thereof a known functional film, such as an adhesiveness improving film, an antireflection film and a gas barrier film. The electrode that is not formed on the display surface (the transparent electrode 6 in the embodiment) may not be transparent.

(Display Layer)

The display layer in the embodiment has such a function that the reflection or transmission state of only light having a specific color among incident light is modulated with an electric field, and the selected state is maintained under no electric field. The display layer preferably has such a structure that withstands deformation due to an external force, such as flexure and pressure.

The display layer in the embodiment has a liquid crystal layer of a self-maintaining liquid crystal composite containing a cholesteric liquid crystal and a transparent resin. In other words, the composite is a liquid crystal layer having self-maintaining property without a spacer or the like. In the embodiment, a cholesteric liquid crystal is dispersed in a polymer matrix (transparent resin) while not shown in the figure.

In the invention, the display layer may not necessarily a liquid crystal layer of a self-maintaining liquid crystal composite, and the display layer may be constituted only by a liquid crystal.

The cholesteric liquid crystal has a function of modulating the reflection or transmission state to light having a specific color among incident light, in which liquid crystal molecules are oriented with twisting in a helical form, so as to interfere and reflect only specific light depending on the helical pitch among light incident from the direction of the helical axis. The orientation of the molecules is changed with an electric field to change the reflection state. In the case where the display layer is a self-maintaining liquid crystal composite, droplets of the cholesteric liquid crystal preferably have a uniform size and are preferably disposed densely to form a single layer.

Examples of a liquid crystal that can be used as the cholesteric liquid crystal include a nematic liquid crystal and a smectic liquid crystal (such as a Schiff base series, an azo series, an azoxy series, a benzoate ester series, a biphenyl series, a terphenyl series, a cyclohexylcarboxylate ester series, a phenylcyclohexane series, a biphenylcyclohexane series, a pyrimidine series, a dioxane series, a cyclohexylcyclohexane ester series, a cyclohexylethane series, a cyclohexane series, a tolan series, an alkenyl series, a stilbene series and a polycondensed ring series), and a mixture thereof having an optically active material (such as a steroid cholesterol series derivative, a Schiff base series, an azo series, an ester series and a biphenyl series) added thereto.

The helical pitch of the cholesteric liquid crystal is controlled by the addition amount of the chiral agent with respect to the nematic liquid crystal. For example, in the case where the display colors are blue, green and red, the center wavelengths of selective reflection are in the ranges of from 400 to 500 nm, from 500 to 600 nm and from 600 to 700 nm, respectively. In order to compensate the temperature dependency of the helical pitch of the cholesteric liquid crystal, such a known measure may be employed that plural chiral agents having different twist directions or opposite temperature dependencies are added.

Examples of the configuration of the display layers 7a and 7b constituting the self-maintaining liquid crystal composite containing the cholesteric liquid crystal and the polymer matrix (transparent resin) include a PNLC (polymer network liquid crystal) structure containing a network resin in a continuous texture of the cholesteric liquid crystal, and the PDLC (polymer dispersed liquid crystal) structure containing the cholesteric liquid crystal dispersed as droplets in a polymer skeleton (including those microcapslated). The PNLC structure and the PDLC structure form an anchoring effect at an interface between the cholesteric liquid crystal and the polymer, whereby the maintaining state of a planar texture or a focal conic texture under no electric field can be further stabilized.

The PNLC structure and the PDLC structure can be formed by such known methods as a PIPS (polymerization induced texture separation) method, in which a polymer precursor capable of being polymerized with heat, light, an electron beam or the like, such as an acrylic series, a thiol series and an epoxy series, is mixed with a liquid crystal, and the resulting uniform texture is polymerized to induce texture separation, an emulsion method, in which a polymer having a low solubility to a liquid crystal, such as polyvinyl alcohol, is mixed with the liquid crystal, and agitated to disperse droplets of the liquid crystal in the polymer, a TIPS (thermally induced texture separation) method, in which a thermoplastic polymer and a liquid crystal are mixed and heated to obtain a uniform texture, which is then cooled to induce texture separation, and an SIPS (solvent induced texture separation) method, in which a polymer and a liquid crystal are dissolved in a solvent, such as chloroform, and the solvent is evaporated to induce texture separation of the polymer and the liquid crystal, but the invention is not limited to these methods.

The polymer matrix has such a function that the cholesteric liquid crystal is maintained to suppress flowage of the liquid crystal (change of an image) due to deformation of the display medium, and preferred examples thereof include a polymer material that is not dissolved in a liquid crystal material and is dissolved in a solvent that is not compatible with the liquid crystal. It is desirable that the polymer matrix has strength for withstanding an external force and exhibits high transparency at least to the reflection light and the addressing light.

Examples of the material that can be used as the polymer matrix include a water soluble polymer material (such as gelatin, polyvinyl alcohol, a cellulose derivative, a polyacrylic acid polymer, ethylene imine, polyethylene oxide, polyacrylamide, polystyrenesulfonate salt, polyamidine and an isoprene sulfonic acid polymer), and a material that can form an aqueous emulsion (such as a fluorine resin, a silicone resin, an acrylic resin, a urethane resin and an epoxy resin).

In the display medium 1 as a stacked light modulating device using the threshold value shifting method, the display layer 7a and the display layer 7b are demanded to have upper and lower threshold values that are separated from each other at suitable distances to secure operation margins of the threshold value shifting method. In the invention, the threshold values are appropriately controlling by adjusting the capacitance ratio and the resistance ratio with the liquid crystal materials and the thickness of the respective layers.

The specific resistance of a liquid crystal material can be controlled by mixing a fluorine material having a high resistance and a cyano material having a low resistance or by adding an ionic impurity to the liquid crystal material. In this case, a suitable difference in capacitance is provided between the display layers. The difference in capacitance between the display layers can be controlled by changing the dielectric constant of the liquid crystal material and the thickness of the display layers.

Furthermore, the switching behaviors of the display layers 7a and 7b can also be controlled by the dielectric anisotropy, the modulus of elasticity, the helical pitch, the skeleton structure and the side chain of the polymer, the texture separation process, the morphology of the interface between the polymer matrix and the display layers 7a and 7b, and the extent of the anchoring effect at the interface between the polymer matrix and the display layers 7a and 7b determined totally by these factors.

More specifically, examples of the factors include the species and compositional ratio of the nematic liquid crystal, the species of the chiral agent, the species of the resin, the species and compositional ratio of a monomer, an oligomer, an initiating agent and a crosslinking agent, which are starting materials of the polymer resin, the polymerization temperature, the exposure light source, the exposure intensity, the exposure time and the ambient temperature for photopolymerization, the electron beam intensity, the exposure time and the ambient temperature for electron beam polymerization, and the species and compositional ratio of the solvent, the solution concentration, the wet thickness, the drying temperature, the temperature for initiating temperature decrease and the temperature decreasing rate upon coating and drying the coating composition, but the invention is not limited to these factors.

(Writing Device)

The writing device (driving device of a stacked light modulating device) 2 in the embodiment is an apparatus for writing an image to the display medium 1, and has a voltage applying part (electric power source) 17 as a major constitutional element, and also a controlling circuit 16 controlling the operation thereof.

(Voltage Applying Part)

The voltage applying part (electric power source) 17 has such a function that the prescribed bias voltage is applied to the display medium 1, and a desired voltage waveform can be applied to the display medium (between the electrodes) based on the input signal from the controlling circuit 16. It is preferred that the voltage applying part 17 can output AC with a high through rate. In the invention, it is necessary that the frequency of the voltage can be changed since the frequency of the applied voltage is changed between the writing operation at the lower threshold value and the writing operation at the upper threshold value. The voltage applying part 17 may be, for example, a bipolar high voltage amplifier.

The application of a voltage to the display medium 1 by the voltage applying part 17 is effected between the transparent electrodes 5 and 6 through contact terminals 19.

The contact terminals 19 are such members that provide conduction between the voltage applying part 17 and the display medium 1 (transparent electrodes 5 and 6) through contact therewith, and have high electroconductivity and a small contact resistance with the transparent electrodes 5 and 6 and the voltage applying part 17. It is preferred that the display medium 1 and the writing device 2 can be separated from each other at either the transparent electrodes 5 and 6 or the voltage applying part 17 or at both of them.

Examples of the contact terminals 19 include terminals formed of a metal (such as gold, silver, copper, aluminum and iron), carbon, a composite obtained by dispersing these materials in a polymer, and an electroconductive polymer (such as a thiophene series and a polyaniline series) having a clip shape or a connector shape capable of holding the electrodes.
(Controlling Circuit)

The controlling circuit 16 is such a member that has a function of appropriately controlling the operations of the voltage applying part 17 corresponding to image data input from an external device (such as an image importing device, an image receiving device, an image processing device, an image reproducing device and a device having plural functions among these). The specific control operations of the controlling circuit 16 include the first writing step (operation) and the second writing step (operation), which are characteristic in the invention, and the details thereof will be described later.
(Operation)

The driving method of a stacked light modulating device and the operation of the driving device of a stacked light modulating device according to the embodiment will be described in detail below in conjunction with a simple verification experiment. Upon evaluating the operation margins of the display layers, changes in reflectance of the two display layers are difficult to observe in a state where the display layers are directly stacked on each other.

In the verification experiment, accordingly, the display layers are each solely formed and electrically connected in series, and the changes in reflectance of the layers are each measured to evaluate the operation margins approximately.

In the following experiments, a display layer having a low dielectric constant and a high resistivity is designated as a display layer a, and a display layer having a high dielectric constant and a low resistivity is designated as a display layer b.

The display layers a and b have such a structure that s a pair of polyethylene terephthalate (PET) substrates (thickness: 125 μm) each having an ITO electrode are disposed to face each other with the ITO electrodes facing inside, and a polymer-dispersed cholesteric liquid crystal (thickness: 15 μm) is sealed between the substrates.

Liquid crystal materials having different resistivities are used in the display layers a and b, respectively. Specifically, the display layer a having a low dielectric constant and a high resistivity contains a liquid crystal material having been optimized in resistivity by mixing a fluorine liquid crystal with a cyano liquid crystal, and the display layer b having a high dielectric constant and a low resistivity contains a cyano liquid crystal.

Figure 6:
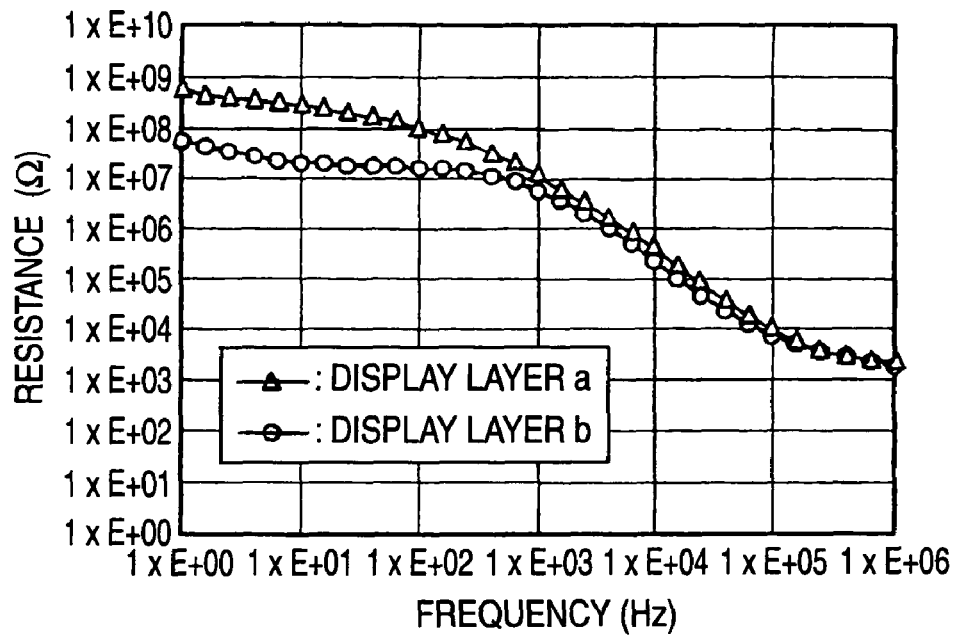
FIG. 6 is a graph showing the resistivity characteristics of the display layers of the stacked light modulating device produced in the embodiment.
Figure 7:
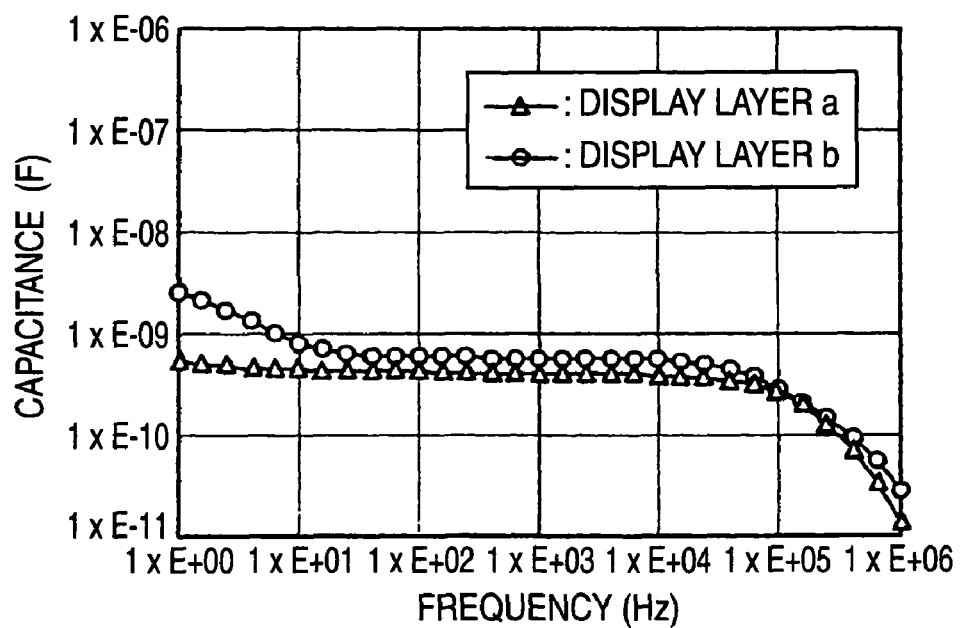
FIG. 7 is a graph showing the capacitance characteristics of the display layers of the stacked light modulating device produced in the embodiment.

It is necessary that a slight difference in capacitance is provided between the display layers a and b. Therefore, the display layer a having a low dielectric constant and a high resistivity has a capacitance of 0.4 nF (50 Hz), and the display layer b having a high dielectric constant and a low resistivity has a capacitance of 0.6 nF (50 Hz). The resistivity characteristics of the display layers a and b thus produced are shown by the graph in FIG. 6, and the capacitance characteristics of them are shown by the graph in FIG. 7.

The display layers a and b are electrically connected in series and are applied with voltage pulses from an external electric power source capable of outputting arbitrary waveforms. Square pulses of 5 Hz are applied on operation at the lower threshold value, and square pulses of 50 Hz are applied on operation at the upper threshold value.

Figure 8:
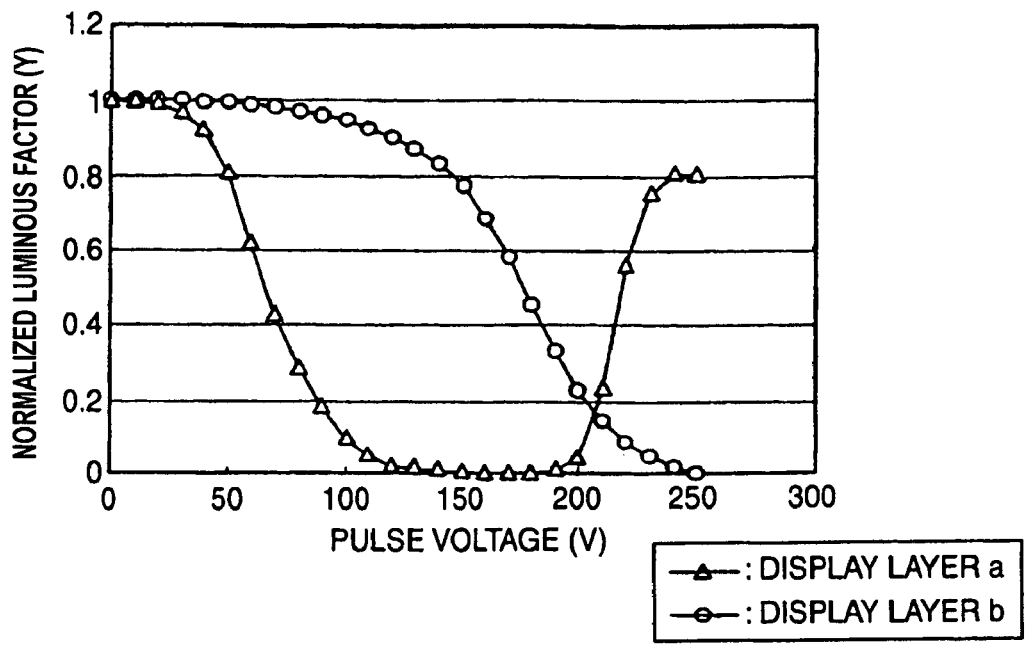
FIG. 8 is a graph showing the optical characteristics of the display layers of the stacked light modulating device produced in the embodiment connected in series upon applying a pulse voltage of 5 Hz.

FIG. 8 is a graph showing the optical characteristics of the display layers a and b connected in series upon applying a pulse voltage of 5 Hz between the ends of the display layers a and b. In FIG. 8, the ordinate shows the normalized luminous factor (Y) where the maximum Y of the display layer is designated as 1, and the minimum Y thereof is designated as 0, and the abscissa shows the pulse voltage applied. The measurement of the normalized Y is effected after releasing the application of the pulse voltage. It is understood from the graph shown in FIG. 8 that the lower threshold values of the display layers a and b are clearly deviated from each other. The operation margin Vm at the lower threshold values obtained by the aforementioned calculation equation is 0.18.

Figure 9:
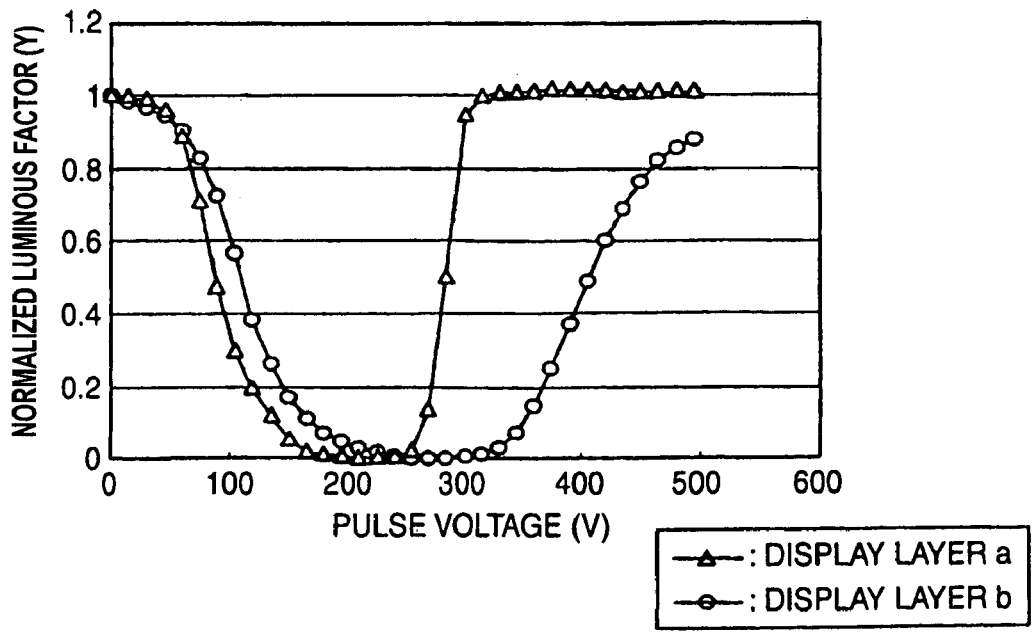
FIG. 9 is a graph showing the optical characteristics as similar to FIG. 8 upon applying a pulse voltage of 50 Hz.

FIG. 9 is a graph showing the optical characteristics of the display layers a and b connected in series upon applying a pulse voltage of 50 Hz between the ends of the display layers a and b. The ordinate and abscissa in FIG. 9 are the same as in FIG. 8. It is understood from the graph shown in FIG. 9 that the upper threshold values of the display layers a and b are clearly deviated from each other. The operation margin Vm at the upper threshold values obtained by the aforementioned calculation equation is 0.15.

Upon application of pulses having a relatively low frequency, such as 5 Hz, the partial voltage ratio applied to the display layers is relaxed from the momentary capacitance partial voltage to the resistance partial voltage, and influence of the difference in resistance between the display layers a and b appears. A larger voltage is applied to the display layer a having a low dielectric constant and a high resistance, and thus a sufficient operation margin at the lower threshold value can be secured by differentiating the operation threshold values of the display layers a and b.

Upon applying pulses having a relatively high frequency, such as 50 Hz, on the other hand, the partial voltage ratio applied to the display layers a and b is not relaxed to the resistance partial voltage, and the capacitance ratio of the display layers a and b appears as the partial voltage ratio approximately as it is. As having been described, an operation margin can be easily obtained at the upper threshold value. Therefore, a sufficient operation margin at the upper threshold value can be secured only with the capacitance partial voltage without providing a large capacitance ratio between the display layers a and b.

Figure 10:
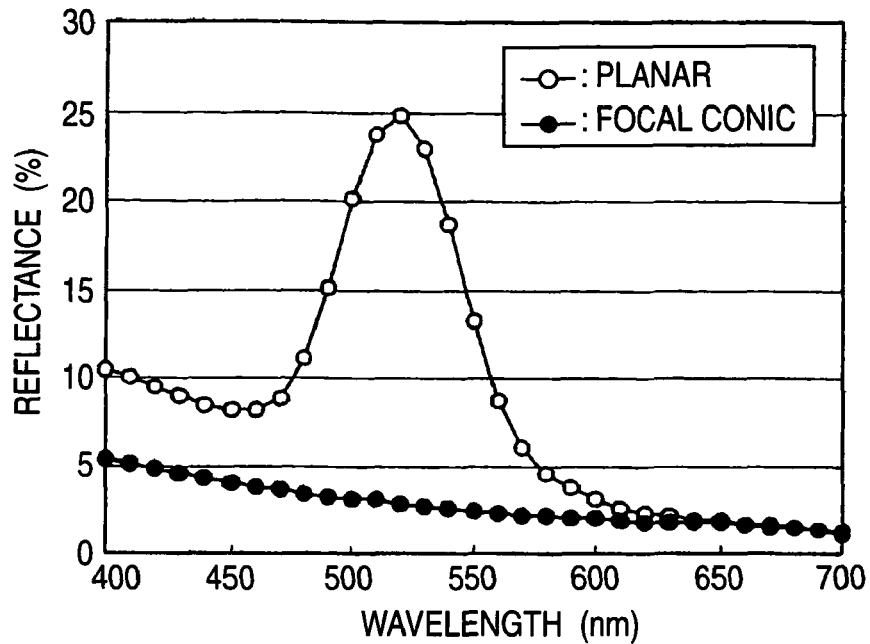
FIG. 10 is a graph showing a reflection spectrum of one of the display layers of the stacked light modulating device produced in the embodiment.
Figure 11:
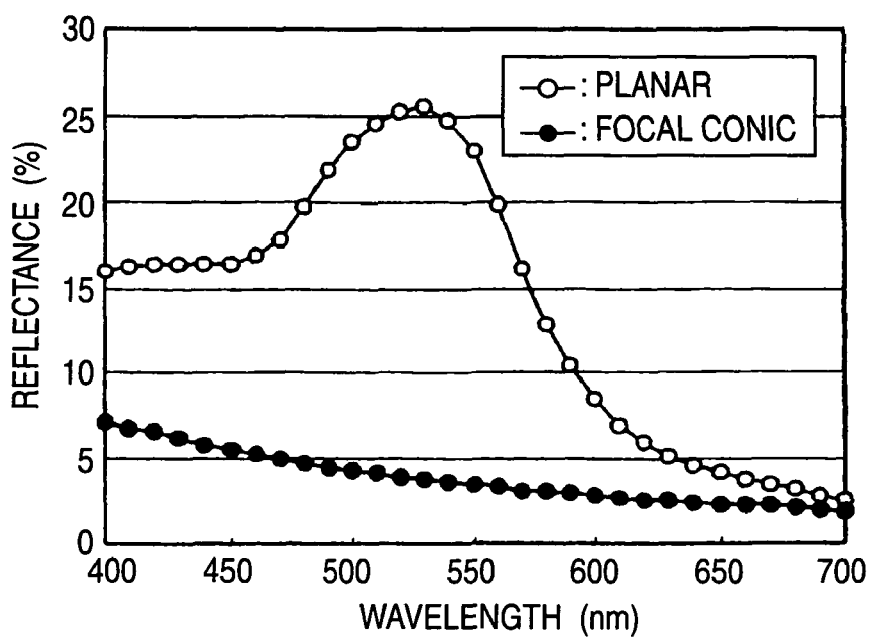
FIG. 11 is a graph showing a reflection spectrum of another one of the display layers of the stacked light modulating device produced in the embodiment.

FIGS. 10 and 11 show reflection spectra of the display layers a and b produced above, respectively. Both the display layers a and b provide a high reflectance of about 25%, and thus it is demonstrated by the verification experiment that the threshold value shift driving can be effected without deterioration in reflectance by using the driving method of a stacked light modulating device according to the invention.

In the case where the two display layers a and b are stacked to obtain the stacked light modulating device 1 shown in FIG. 1, the first writing step and the second writing step according to the driving method of a stacked light modulating device (containing no photoconductor layer) of the invention are effected, whereby sufficient operation margins can be obtained at the upper and lower threshold values while maintaining a sufficient reflectance to realize stable threshold value shift driving.

Figure 16:
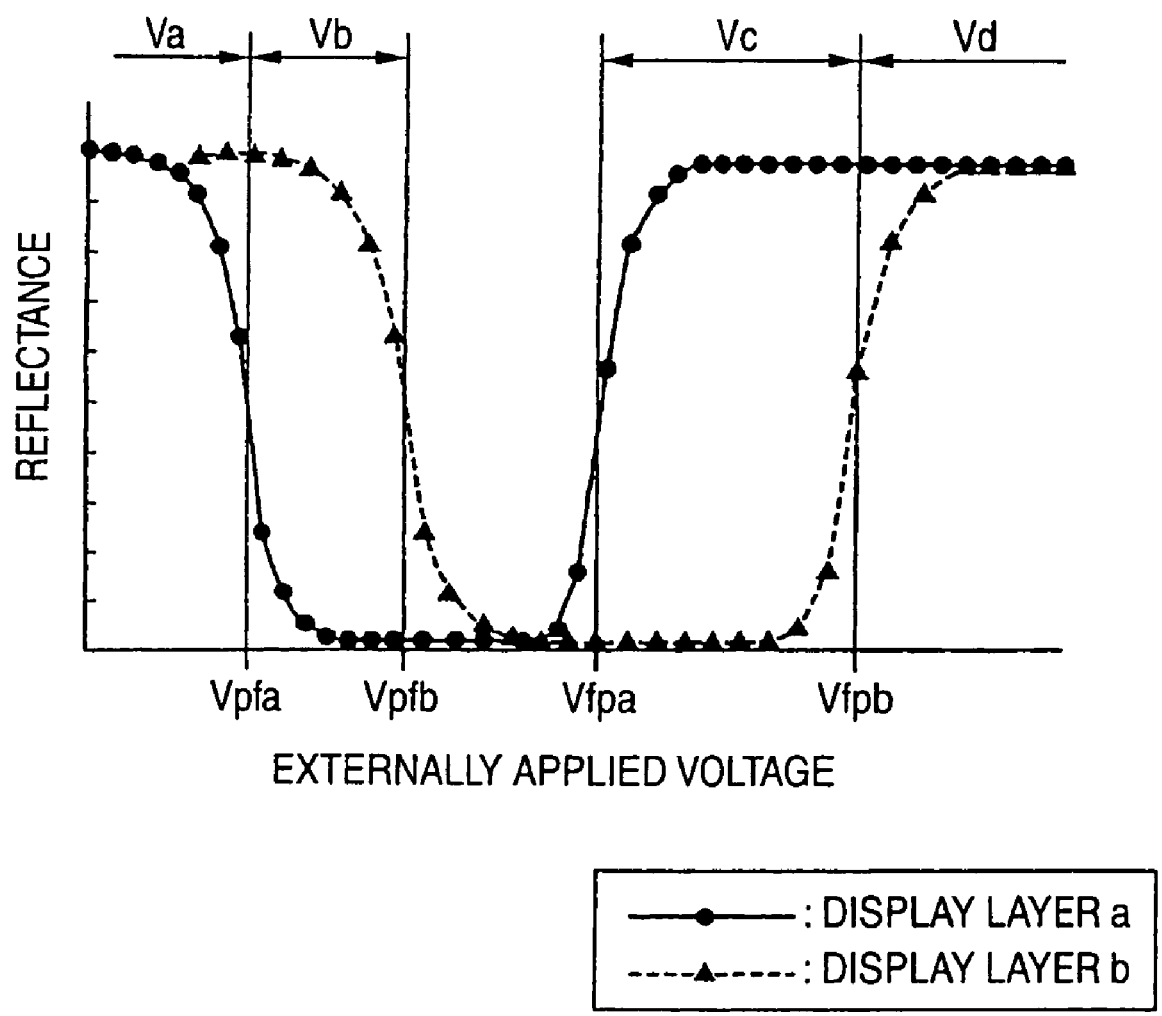
FIG. 16 is a graph showing a switching behavior of cholesteric liquid crystals of display layers of a stacked light modulating device, to which the threshold value shifting method is applied.
Figure 17:
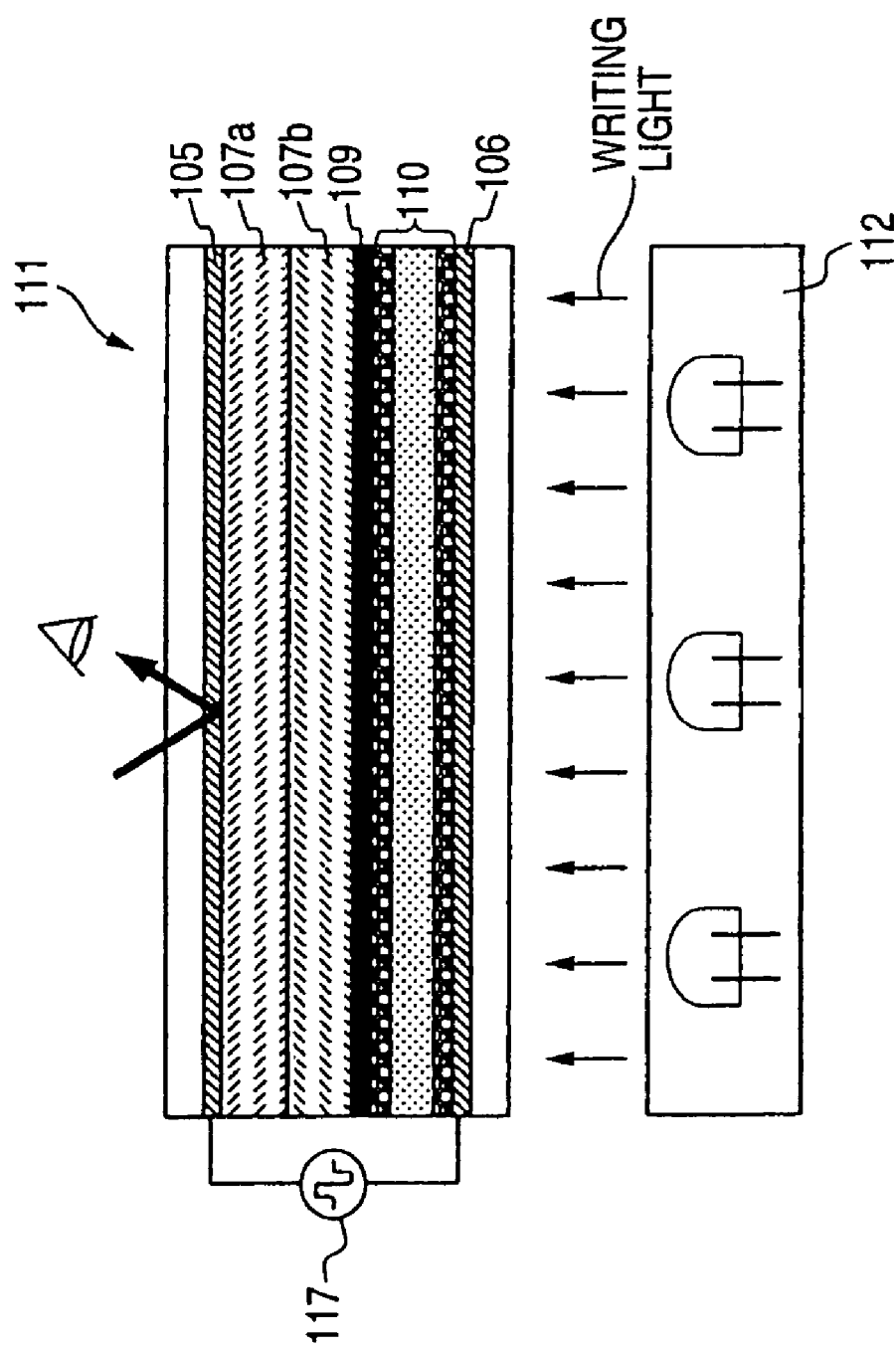
FIG. 17 is a schematic cross sectional view showing a state of image writing by the threshold value shifting method using a stacked light modulating device containing a photoconductor layer.

The following description will be made with reference to the graph shown in FIG. 16, which has been used for describing the conventional techniques. The graph can be sufficiently used for describing the steps of the invention although the configuration thereof is different from the case of the stacked light modulating device obtained by stacking the display layers a and b in a strict meaning.
(First Writing Step)

The display layers are selectively applied with a voltage within a range Vc, which is lower than the upper threshold value Vfpb of the display layer b but higher than the upper threshold value Vfpa of the display layer a, or a voltage within a range Vd, which is higher than the threshold value Vfpb of the display layer b, with a pulse waveform having a frequency of 50 Hz. In a part applied with the voltage with the range Vc, the display layer b is in a focal conic texture, and the display layer a is in a homeotropic texture. In apart applied with the voltage within the range Vd, the display layer a is in a homeotropic texture as similar to the part applied with the voltage within the range Vc, but the display layer b is changed to a homeotropic texture since the voltage exceeds the upper threshold value Vpfb.

Accordingly, the texture of the display layer b can be selected from either a focal conic texture or a homeotropic texture by selecting a voltage applied with the electric power source 17 from either a voltage within the range Vc or a voltage within the range Vd. When the applied voltage is quickly released in this stage, the homeotropic texture is changed to a planar texture, and the focal conic texture is maintained as it is. On the other hand, the display layer a is in a homeotropic texture with both the voltages applied before releasing, and the entire display layer a is changed to a planar texture by quickly releasing the voltage.

In the first writing step, the textures are selected with respect to each part of the display layer b in this manner.

(Second Writing Step)

After completing the first writing step, the display layers are selectively applied with a voltage within a range Va, which is lower than the lower threshold value Vpfa of the display layer a, or a voltage within a range Vb, which is higher than the lower threshold value Vpfa of the display layer a but is lower than the lower threshold value Vfpb of the display layer b, with a pulse waveform having a frequency of 5 Hz. In a part applied with the voltage with the range Vb, the display layer a undergoes texture change to a focal conic texture since the voltage exceeds the lower threshold value Vpfa, and in a part applied with the voltage within the range Va, the display layer a maintains the planar texture state since the voltage does not exceeds the lower threshold value Vpfa.

On the other hand, the display layer b maintains the planar texture or the focal conic texture, which have been selected with respect to the upper threshold values, since both the applied voltages are lower than the lower threshold value Vfpb.

In the second writing step, the textures are selected with respect to each part of the display layer a in this manner.

The aforementioned writing steps are sequentially executed, and thus the applied voltage is selected in the two-step voltage signals corresponding to the upper and lower threshold values, whereby the states of the display layers a and b are changed, i.e., arbitrary one or both of the display layers a and b are in a reflection state, or both of them are in a transmission state, depending on the combination of the voltage, so as to complete the writing operation (driving) of the stacked light modulating device.

Second Embodiment

Figure 12:
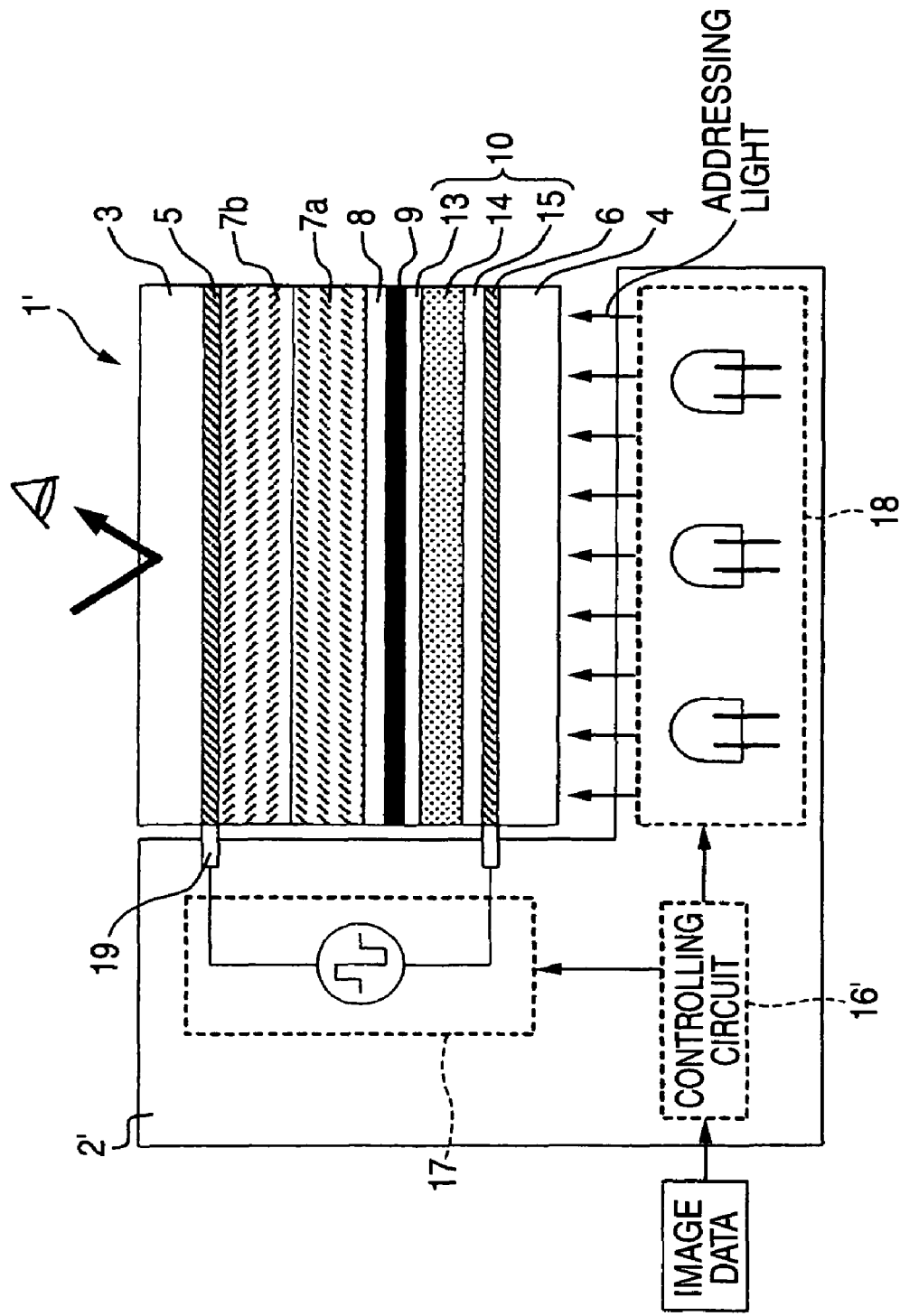
FIG. 12 is a schematic constitutional view showing a second embodiment as one exemplary embodiment of a system, to which the driving method of a stacked light modulating device of the invention.
Figure 13:
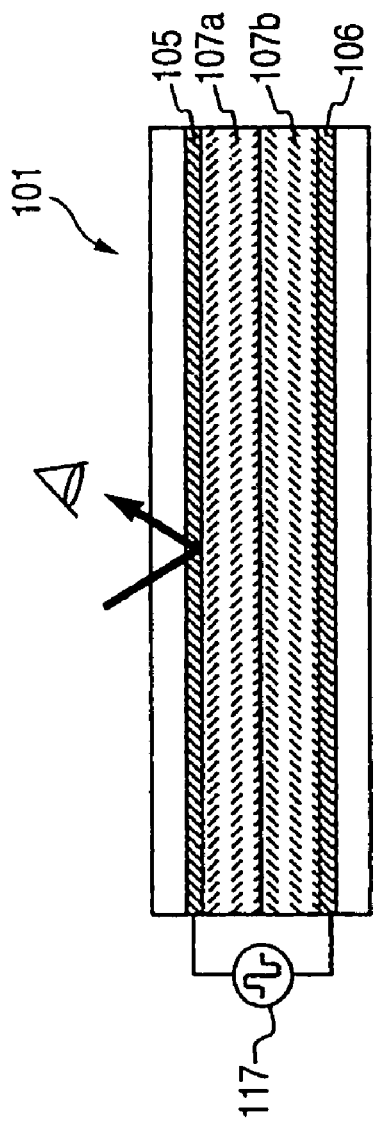
FIG. 13 is a schematic cross sectional view showing a state of image writing by the threshold value shifting method.
Figure 14A:
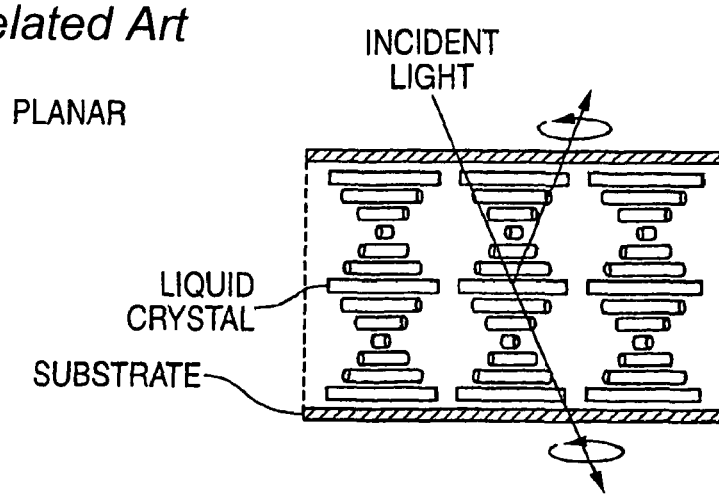
Figure 14B:
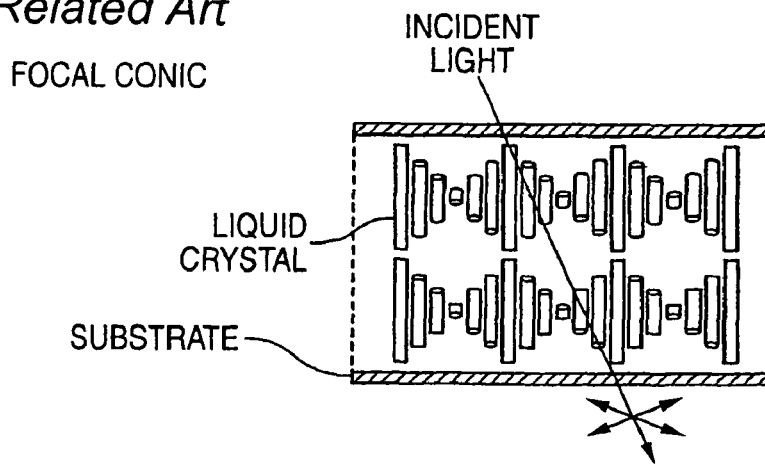
Figure 14C:
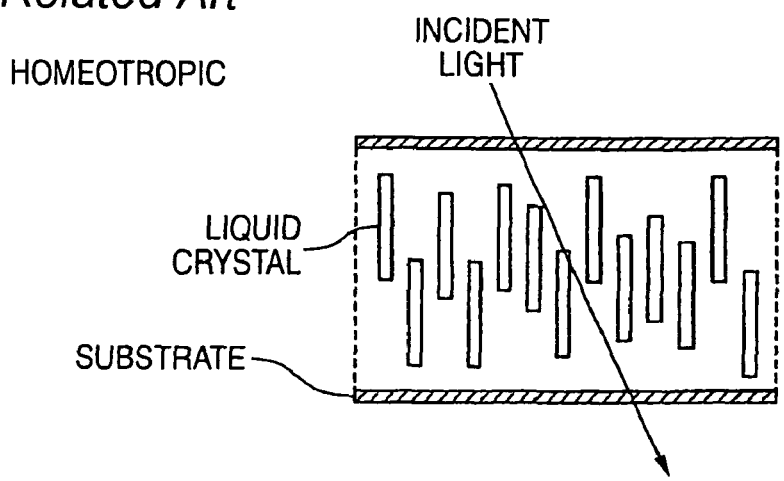
Figure 15:
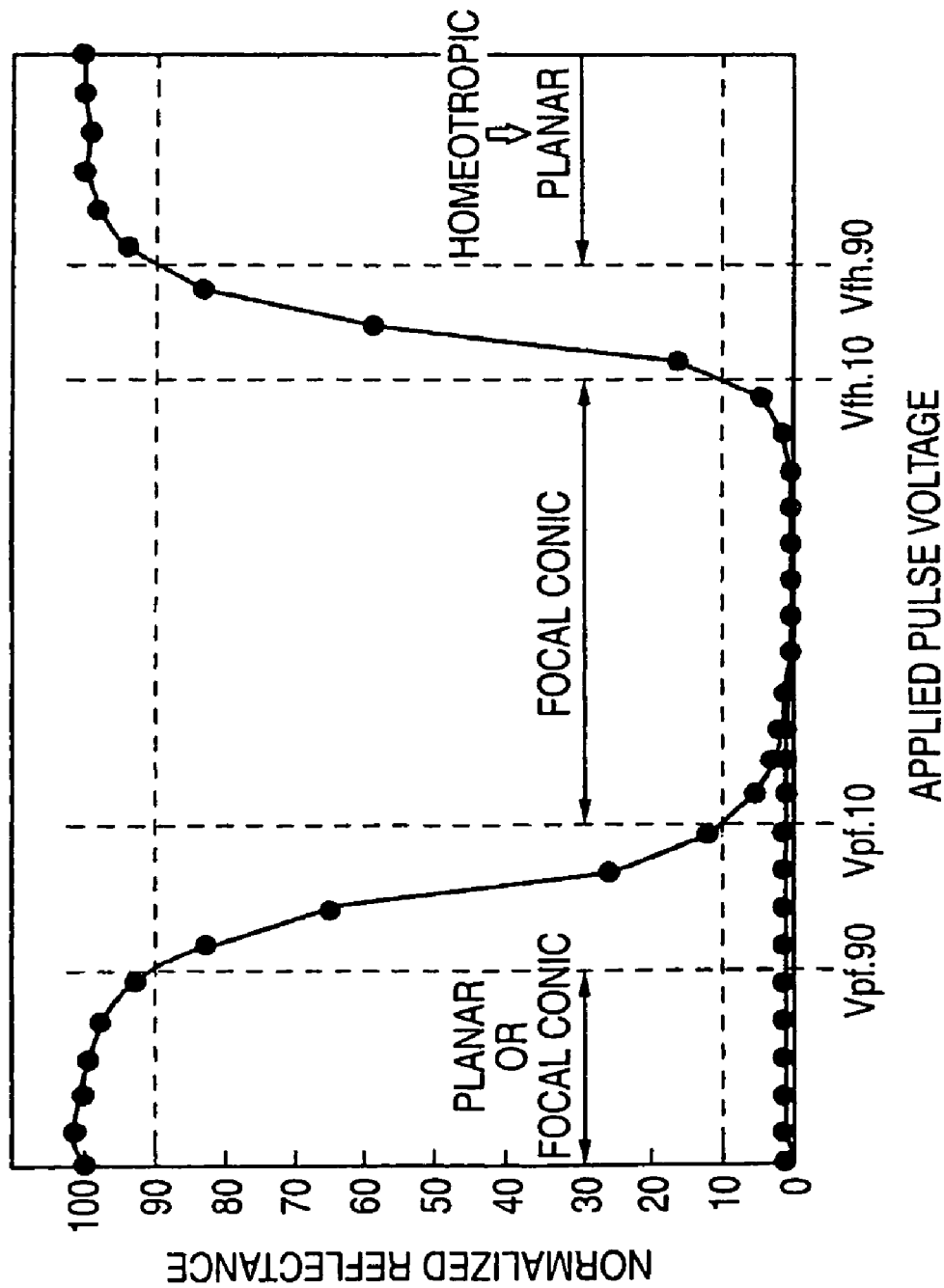
FIG. 15 is a graph showing switching a behavior of a cholesteric liquid crystal.

FIG. 12 is a schematic constitutional view showing a second embodiment as one exemplary embodiment of a system, to which the driving method of a stacked light modulating device of the invention. As similar to the first embodiment, the system according to the second embodiment contains a display medium (stacked light modulating device) 1' and a writing device (a driving device of a stacked light modulating device) 2', provided that the second embodiment is different from the first embodiment in such a point that the display medium (stacked light modulating device) 1' contains a photoconductor layer, and the writing device (a driving device of a stacked light modulating device) 2' also has a different constitution corresponding thereto.

In the following description, the differences of the second embodiment in constitution, function and advantage from the first embodiment are described, and the members having the same functions as in the first embodiment are attached with the same symbols to omit the descriptions thereof accordingly.

(Display Medium)

The display medium in the embodiment is such a member that can be selectively driven with plural liquid crystal layer (selective reflection layers) by irradiating with addressing light and applying a bias signal, and is specifically a stacked light modulating device.

The display medium 1' of the embodiment has, stacked from a display surface in this order, a transparent substrate 3, a transparent electrode 5, a display layer (selective reflection layer) 7b, a display layer (selective reflection layer) 7a, a laminate layer 8, a colored layer (light shielding layer) 9, an OPC layer (photoconductor layer) 10, a transparent electrode (electrode) 6 and a transparent substrate 4. In other words, a laminate layer 8, a colored layer (light shielding layer) 9 and an OPC layer (photoconductor layer) 10 are provided between the display layer (selective reflection layer) 7a and the transparent electrode 6 of the display medium 1 of the first embodiment. Only the layers characteristics in the embodiment will be described in detail below.

(OPC Layer)

The OPC layer (photoconductor layer) 10 is such a layer that has an internal photoelectric effect and changes in impedance characteristics corresponding to the radiation intensity of the addressing light. It is necessary that the OPC layer can be driven with alternating current (AC) and driven symmetrically with respect to the addressing light. The OPC layer has a three-layer structure containing a charge transporting layer (CTL) having charge generating layers (CGL) accumulated on both surfaces thereof. In this embodiment, the OPC layer 10 has an upper charge generating layer 13, a charge transporting layer 14 and a lower charge generating layer 15 accumulated from the upper side in FIG. 12.

The charge generating layers 13 and 15 have such a function that photo carriers are generated through absorption of addressing light. The charge generating layer 13 mainly controls the amount of photo carriers flowing from the transparent electrode 5 on the display surface to the transparent electrode 6 on the writing surface, and the charge generating layer 15 mainly controls the amount of photo carriers flowing from the transparent electrode 6 on the writing surface to the transparent electrode 5 on the display surface. It is preferred that the charge generating layers 13 and 15 generate excitons through absorption addressing light, which are efficiently separated into free carriers in the CGL or at the interface between the CGL and the CTL.

The charge generating layers 13 and 15 can be formed, for example, by a dry method, in which a charge generating material is directly formed into a layer, or a wet coating method, in which a charge generating material is dispersed or dissolved in a suitable solvent along with a polymer binder to obtain a coating composition, which is then coated and dried to form the layer. Examples of the charge generating material include a metallic or non-metallic phthalocyanine, a squalirium compound, an azulenium compound, a perylene pigment, an indigo pigment, a bis- or tris-azo pigment, a quinacridone pigment, a pyrrolopyrol colorant, a polycyclic quinone pigment, a condensed aromatic pigment, such as dibromoanthanthrone, a cyanine colorant, axanthene pigment, a charge transfer complex, such as polyvinylcarbazole and nitrofluorene, and an eutectic complex formed of a pyrylium salt dye and a polycarbonate resin. Examples of the polymer binder include a polyvinyl butyral resin, a polyarylate resin, a polyester resin, a phenol resin, a vinylcarbazole resin, a vinylformal resin, a partially modified vinylacetal resin, a carbonate resin, an acrylic resin, a vinyl chloride resin, a styrene resin, a vinyl acetate resin and a silicone resin.

The charge transporting layer 14 has such a function that the photocarriers generated in the charge generating layers 13 and 15 are injected therein and drifted in the direction of an electric field applied with the bias signal. In general, the CTL has a thickness that is several tens times the thickness of the CGL, and therefore, the contrast impedance of the entire OPC layer 10 is determined by the capacitance of the charge transporting layer 14, the dark current of the charge transporting layer 14 and the photo carrier current inside the charge transporting layer 14.

In the charge transporting layer 14, it is preferred that the injection of free carriers from the charge generating layers 13 and 15 occurs with high efficiency (the charge transporting layer 14 preferably has an ionization potential close to those of the charge generating layers 13 and 15), and the free carriers thus injected undergo hopping migration at a rate as high as possible. In order to increase the dark impedance, the dark current with thermal carriers is preferably low.

The charge transporting layer 14 may be formed in such a manner that a low molecular weight hole transporting material or a low molecular weight electron transporting material is dispersed or dissolved in a suitable solvent along with a polymer binder to obtain a coating composition, and the coating composition is coated and dried. Examples of the low molecular weight hole transporting material include a trinitrofluorene compound, a polyvinylcarbazole compound, an oxadiazole compound, a hydrazone compound, such as benzylamino hydrazone and quinoline hydrazone, a stilbene compound, a triphenylamine compound, a triphenylmethane compound and a benzidine compound. Examples of the low molecular weight electron transporting material include a quinone compound, a tetracyanoquinodimethane compound, a fluorenone compound, a xanthone compound and a benzophenone compound. Examples of the polymer binder include a polycarbonate resin, a polyarylate resin, a polyester resin, a polyimide resin a polyamide resin, a polystyrene resin and a silicon-containing crosslinked resin.

(Colored Layer)

The colored layer (light shielding layer) 9 is provided for such a purpose that addressing light and writing light are separated to prevent malfunction due to mutual interference, and is not an essential constitutional element of the invention. However, the colored layer 9 is preferably provided for improving the performance of the display medium 1'. In consideration of the purpose of the colored layer 9, it is demanded to have a function of absorbing at least light at the absorption wavelength of the CGL.

The colored layer 9 may be formed, for example, by directly coating an inorganic pigment, an organic dye or an organic pigment on the surface of the OPC layer 10 on the side of the charge generating layer 13, or by dispersing or dissolving the pigment or dye in a suitable solvent along with a polymer binder to obtain a coating composition, which is then coated and dried to form the layer. Examples of the inorganic pigment include a cadmium series, a chromium series, a cobalt series, a manganese series and a carbon series. Examples of the organic dye and organic pigment include an azo series, ananthraquinone series, an indigo series, a triphenylmethane series, a nitro series, a phthalocyanine series, a perylene series, a pyrrolopyrol series, a quinacridone series, a polycyclic quinone series, a squalirium series, an azulenium series, a cyanine series, a pyrylium series and an anthrone series. Examples of the polymer binder include a polyvinyl alcohol resin and a polyacrylic resin.

(Laminate Layer)

The laminate layer 8 may be formed of a polymer material having a low glass transition temperature, which is selected from such materials that are capable of adhering the display layers 7a and 7b and the colored layer 9 through heat or pressure. The laminate layer 8 is demanded to have transmissibility at least to incident light and addressing light.

Examples of a material suitable for the laminate layer 8 include an adhesive polymer material (such as aurethane resin, an epoxy resin, an acrylic resin and a silicone resin).

The laminate layer 8 is not an essential constitutional element of the invention.

(Writing Device)

The writing device (driving device of a stacked light modulating device) 2' in the invention is an apparatus for writing an image to the display medium 1', and has a light irradiating part (exposure device) 18 irradiating the display medium 1' with addressing light and a voltage applying part (electric power device) 17 applying a bias voltage to the display medium 1' as major constitutional elements, and also a controlling circuit 16' controlling them. In other words, the light irradiating part 18 is added to the writing device 2 in the first embodiment, and the controlling circuit 16' has a function of controlling the operation of the light irradiating part 18 in addition to the voltage applying part 17. Only the light irradiating part 18 characteristic in the embodiment will be described in detail below.

(Light Irradiating Part)

The light irradiating part (exposure device) 18 has such a function that the display device 1' is irradiated with addressing light having a prescribed imagewise pattern, and is not particularly limited as far as it can irradiate the surface of the display medium 1' (specifically, the OPC layer) with a desired light image pattern (including spectrum, intensity and spatial frequency).

The addressing light irradiated with the light irradiating part 18 preferably satisfies the following conditions.

The spectrum thereof preferably contains energy of the absorption wavelength range of the OPC layer 10 as much as possible.

The irradiation intensity thereof is preferably such an intensity that provides a voltage applied to the display layers 7a and 7b higher than the upper and lower threshold values through partial voltage with the OPC layer 10 to cause texture change of the liquid crystals of the display layers 7a and 7b in a bright state but provides a voltage lower than the threshold values in a dark state.

The addressing light irradiated with the light irradiation part 18 preferably has a peak intensity within the absorption wavelength range of the OPC layer 10 and has a bandwidth as narrow as possible.

Examples of the light irradiating part 18 include the following.

(1-1) An ordinary light source, such as a unit obtained by arranging light sources (such as a cold cathode tube, a xenon lamp, a halogen lamp, an LED and an EL) in an array form, and a unit obtained by combining a light source with a light guide plate.

(1-2) A combination of a light modulating device (such as an LCD and a photomask) providing a light pattern (2) A planar light emission display (such as CRT, PDP, EL, LED, FED and SED)

(3) A combination of (1-1), (1-2) or (2) with an optical device (such as a microlens array, a Selfoc lens array, a prism array and a viewing angle adjusting sheet)

(Controlling Circuit)

The controlling circuit 16' is such a member that have a function of appropriately controlling the operations of the voltage applying part 17 and the light irradiating part 18 corresponding to image data input from an external device (such as an image importing device, an image receiving device, an image processing device, an image reproducing device and a device having plural functions among these). The control operations of the controlling circuit 16' include two step (operations), i.e., the first writing step (operation) and the second writing step (operation), which are characteristic in the invention, and the details thereof will be described later.

(Operation)

In this embodiment, it is demonstrated that the display layers can undergo threshold value shift driving through the same verification experiment as in the first embodiment, in which the display layers basically have the same layer structures.

In the case where the two display layers a and b having been subjected to the verification experiment are stacked to obtain the stacked light modulating device, the first writing step and the second writing step according to the driving method of a stacked light modulating device (containing a photoconductor layer) of the invention are effected, whereby sufficient operation margins can be obtained at the upper and lower threshold values while maintaining a sufficient reflectance to realize stable threshold value shift driving.

The following description will be made with reference to the graph shown in FIG. 16, which has been used for describing the conventional techniques, for the same reasons as described for the first embodiment.

(First Writing Step)

The entire display layers are applied with a bias voltage (reset voltage) providing a voltage applied to the entire display layers within a range Vc, which is lower than the upper threshold value Vfpb of the display layer b but higher than the upper threshold value Vfpa of the display layer a, with a pulse waveform having a frequency of 50 Hz, and simultaneously, the display layers are selectively exposed with the exposing device, whereby the resistance of the photoconductor layer in the exposed part is changed (lowered) to increase the partial voltages of the display layers a and b. According to the operation, the voltage applied to the display layers a and b in the exposed part exceeds the upper threshold value Vpfb to change the display layer b to a homeotropic texture.

In the non-exposed part, the display layers are applied with the voltage within the range Vc, whereby the display layer b is in a focal conic texture.

On the other hand, the display layer a is in a homeotropic texture in both the exposed part and the non-exposed part. When the applied voltage is quickly released in this stage, the homeotropic texture is changed to a planar texture, and the focal conic texture is maintained as it is. Accordingly, the textures are selected with respect to each part of the display layer b in this manner.

(Second Writing Step)

After completing the first writing step, the entire display layers are applied with a bias voltage (select voltage) providing a voltage applied to the entire display layers within a range Va, which is lower than the lower threshold value Vpfa of the display layer a, with a pulse waveform having a frequency of 5 Hz, and simultaneously, the display layers are selectively exposed with the exposing device, whereby the partial voltages of the display layers a and b in the exposed part are increased in the same manner as in the first writing step. According to the operation, the voltage applied to the display layers a and b in the exposed part exceeds the lower threshold value Vpfa to change the display layer a to a focal conic texture. In the non-exposed part, the display layers are applied with the voltage within the range Va, whereby the display layer a maintains the planar texture.

On the other hand, the display layer b is in a planar texture or a focal conic texture in both the exposed part and the non-exposed part.

In the second writing step, accordingly, the textures are selected with respect to each part of the display layer a in this manner.

The aforementioned writing steps are sequentially executed, and thus exposure and non-exposure are selected while applying the two-step voltage signals corresponding to the upper and lower threshold values, whereby the states of the display layers a and b are changed, i.e., arbitrary one or both of the display layers a and b are in a reflection state, or both of them are in a transmission state, depending on the combination of voltage and exposure, so as to complete the writing operation (driving) of the stacked light modulating device.

While the invention has been described in detail with reference to the two preferred embodiments, the invention is not limited to the embodiments. For example, the embodiments are described with a selective reflection layer (display layer) having a two-layer structure as an example, but the selective reflection layer in the invention is not limited to a two-layer structure but may have a three-layer structure. In the case where a three-layer structure is employed, in which the layers exhibit blue, green and red colors, respectively, for additive color mixing, a full color image can be easily obtained by the simple driving technique according to the invention.

In the case where a selective reflection layer having a three-layer structure is used, the voltages of the threshold values of the three layers are differentiated from each other. Assuming the three display layers are referred to as a display layer a, a display layer b and a display layer c, from the lower threshold voltage in this order, the following voltages are appropriately selected with an applied voltage or an intensity of exposure light, whereby the selective reflection layers can be respectively switched.

Voltage a less than the lower threshold value Vpfa of the display layer a

Voltage b exceeding the voltage a but less than the lower threshold value Vpfa of the display layer a Voltage c exceeding the voltage b but less than the upper threshold value Vfpa of the display layer a Voltage d exceeding the voltage c but less than the lower threshold value Vpfc of the display layer c Voltage e exceeding the voltage d but less than the upper threshold value Vfpb of the display layer b Voltage f exceeding the voltage e but less than the upper threshold value Vfpc of the display layer c Voltage g exceeding the upper threshold value Vfpc of the display layer c In the case where the stacked light modulating device contains no photoconductor layer, a voltage is applied through selection among the voltage e, the voltage f and the voltage g, and then a voltage is applied through selection among the voltage a, the voltage b, the voltage c and the voltage d, whereby execution or non-execution of switching is selected for the selective reflection layers respectively. That is, driving of the selective reflection layers can be selected by appropriately selecting the applied voltage from the seven voltages, and thus an image can be written in simultaneously with signals at one time.

In the case where the stacked light modulating device contains a photoconductor layer, the display layers are exposed while applying the voltage e or the voltage g, whereby execution or non-execution of switching is selected for the selective reflection layers respectively. At this time, the exposure intensity is designed in such a manner that the intensity of the light used for exposure is selected from four intensities to cause texture change in the selective reflection layer having the intended threshold value.

According to the aforementioned design, the switching states of the three layers can be freely selected through exposure at one time. That is, the exposure intensity is selected from four intensities while applying a constant voltage, whereby driving of the selective reflection layers can be selected, and thus an image can be written in simultaneously with signals at one time.

The switching operation can be effected at the upper and lower threshold values, respectively, and therefore, the first writing step (operation) and the second writing step (operation) can be carried out as similar to the aforementioned embodiments. Even in the case of a selective reflection layer having a three-layer structure, the voltages applied at the upper and lower threshold values are differentiated in frequency from each other, whereby the capacitance partial voltage ratio can be relaxed to the resistance partial voltage ratio to secure the operation margin at the lower threshold value without depending on the capacitance partial voltage.

In the three-layer structure, particularly, the degree of freedom in selecting materials is liable to be reduced since operation margins should be secured among the three layers. According to the invention relaxing the capacitance partial voltage to the resistance partial voltage, however, the restriction in selecting materials depending on difference in dielectric constant can be removed or reduced, and thus the materials can be selected depending on resistance. Consequently, according to the invention, the stable threshold value shifting operation can be realized with high reflectance of all the three layers.

In other words, the significant advantages of the invention can be exhibited not only in the two-layer structure, but also in the three-layer structure, in which operation margins among the layers are difficult to be secured.

In the invention, the selective reflection layer may have not only a two- or three-layer structure, but also a structure containing four or more layers. In the case containing four or more layers, the switching states of the selective reflection layers can be selected by appropriately controlling the intensity and the number of the applied voltages (with no photoconductor layer), or by appropriately controlling the intensity and the number of the exposure (with a photoconductor layer), as similar to the case of the three-layer structure. The increase of the number of selective reflection layers aggravates the difficulty in securing operation margins, and thus the invention is particularly effective in such cases.

Various modifications may be made in the invention by a skilled person in the art based on the conventional knowledge, and embodiments containing those modifications are encompassed in the scope of the invention as far as they have the constitution of the invention.

The entire disclosure of Japanese Patent Application No. 2005-240607 filed on Aug. 23, 2005 including specification, claims, drawings and abstract is incorporated herein by reference in its entirety.

What is claimed is:

1. A driving method of a stacked light modulating device for recording an image therein,
the stacked light modulating device comprising a plurality of selective reflection layers each comprising an operationally cholesteric liquid crystal stacked without an electrode intervening between the selective reflection layers, and a pair of electrodes disposed outside stacked layers,
the selective reflection layers each reflecting light with different wavelengths within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, and
the selective reflection layers being different from each other in resistance and capacitance,
the driving method comprising:
a first step including applying simultaneously, between the pair of electrodes, voltages V1 and V2 that each have a first frequency, the voltage V1 exceeding the upper threshold value of each of a first selective reflection layer and a second selective reflection layer and the voltage V2 exceeding the upper threshold value of the first selective reflection layer and being less than the upper threshold value of the second selective reflection layer; and
a second step including applying simultaneously, between the pair of electrodes, voltages V3 and V4 that each have a second frequency, the voltage V3 being less than the lower threshold value of each of the first selective reflection layer and the second reflection layer and the voltage V4 exceeding the lower threshold value of the first selective reflection layer and being less than the lower threshold value of the second selective reflection layer,
wherein the first frequency is different than the second frequency, the first step sets the texture of the second selective reflection layer when at steady state, and the second step sets the texture of the first selective reflection layer when at steady state,
the second frequency is smaller than the first frequency, and
the second frequency is in a range of 0 to 100 Hz.

2. The driving method of a stacked light modulating device as claimed in claim 1, wherein
the selective reflection layers have a two-layer structure or a three-layer structure.

3. The driving method of a stacked light modulating device as claimed in claim 1, wherein
the selective reflection layers each comprise the cholesteric liquid crystal dispersed in a polymer.

4. A driving method of a stacked light modulating device for recording an image therein,
the stacked light modulating device comprising a plurality of selective reflection layers each comprising an operationally cholesteric liquid crystal stacked without an electrode intervening between the selective reflection layers, a photoconductor layer stacked on one side of the stacked layers, and a pair of electrodes disposed outside stacked layers,
the selective reflection layers each reflecting light with different wavelengths within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, and the selective reflection layers being different from each other in resistance and capacitance, the driving method comprising:

a first step including selectively exposing the stacked light modulating device while applying simultaneously, between the pair of electrodes, voltages V1 and V2 that each have a first frequency, the voltage V1 exceeding the upper threshold value of each of a first selective reflection layer and a second selective reflection layer and the voltage V2 exceeding the upper threshold value of the first selective reflection layer and being less than the upper threshold value of the second selective reflection layer; and a second step including selectively exposing the stacked light modulating device while applying simultaneously, between the pair of electrodes, voltages V3 and V4 that each have a second frequency, the voltage V3 being less than the lower threshold value of each of the first selective reflection layer and the second reflection layer and the voltage V4 exceeding the lower threshold value of the first selective reflection layer and being less than the lower threshold value of the second selective reflection layer, wherein the first frequency is different than the second frequency, the first step sets the texture of the second selective reflection layer when at steady state, and the second step sets the texture of the first selective reflection layer when at steady state, the second frequency is smaller than the first frequency, and the second frequency is in a range of 0 to 100 Hz.

5. The driving method of a stacked light modulating device as claimed in claim 4, wherein
the photoconductor layer comprises an organic photoconductor.

6. The driving method of a stacked light modulating device as claimed in claim 4, wherein
the selective reflection layers have a two-layer structure or a three-layer structure.

7. The driving method of a stacked light modulating device as claimed in claim 4, wherein
the selective reflection layers each comprise the cholesteric liquid crystal dispersed in a polymer.

8. A driving device of a stacked light modulating device for recording an image therein,
the stacked light modulating device comprising a plurality of selective reflection layers each comprising an operationally cholesteric liquid crystal stacked without an electrode intervening between the selective reflection layers, and a pair of electrodes disposed outside stacked layers,
the selective reflection layers each reflecting light with different wavelengths Within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, and
the selective reflection layers being different from each other in resistance and capacitance,
the driving device comprising an electric power source capable of applying a voltage between the pair of electrodes, wherein
the driving device executes sequentially:
a first writing step including applying simultaneously, between the pair of electrodes, voltages V1 and V2 that each have a first frequency, the voltage V1 exceeding the upper threshold value of each of a first selective reflection layer and a second selective reflection layer and the voltage V2 exceeding the upper threshold value of the first selective reflection layer and being less than the upper threshold value of the second selective reflection layer; and
a second writing step including applying simultaneously, between the pair of electrodes, voltages V3 and V4 that each have a second frequency, the voltage V3 being less than the lower threshold value of each of the first selective reflection layer and the second reflection layer and the voltage V4 exceeding the lower threshold value of the first selective reflection layer and being less than the lower threshold value of the second selective reflection layer,
wherein the first frequency is different than the second frequency, the first step sets the texture of the second selective reflection layer when at steady state, and the second step sets the texture of the first selective reflection layer when at steady state,
the second frequency is smaller than the first frequency, and
the second frequency is in a range of 0 to 100 Hz.

9. The driving device of a stacked light modulating device as claimed in claim 8, wherein
the selective reflection layers have a two-layer structure or a three-layer structure.

10. The driving device of a stacked light modulating device as claimed in claim 8, wherein
the selective reflection layers each comprise the cholesteric liquid crystal dispersed in a polymer.

11. A driving device of a stacked light modulating device for recording an image therein,
the stacked light modulating device comprising a plurality of selective reflection layers each comprising an operationally cholesteric liquid crystal stacked without an electrode intervening between the selective reflection layers, a photoconductor layer stacked on one side of the stacked layers, and a pair of electrodes disposed outside stacked layers,
the selective reflection layers each reflecting light with different wavelengths within a visible range, and being different in a lower threshold value, which is an operation threshold value of texture change from a planar texture to a focal conic texture with respect to an externally applied voltage, and an upper threshold value, which is an operation threshold value of texture change from the focal conic texture to a homeotropic texture with respect to the externally applied voltage, and
the selective reflection layers being different from each other in resistance and capacitance,
the driving device comprising:
an electric power source capable of applying a voltage between the pair of electrodes; and
an exposing device capable of exposing the stacked light modulating device,
wherein
the driving device executes sequentially:
a first writing step including selectively exposing the stacked light modulating device while applying simultaneously, between the pair of electrodes, voltages V1 and V2 that each have a first frequency, the voltage V1 exceeding the upper threshold value of each of a first selective reflection layer and a second selective reflection layer and the voltage V2 exceeding the upper threshold value of the first selective reflection layer and being less than the upper threshold value of the second selective reflection layer; and a second writing step including selectively exposing the stacked light modulating device while applying simultaneously, between the pair of electrodes, voltages V3 and V4 that each have a second frequency, the voltage V3 being less than the lower threshold value of each of the first selective reflection layer and the second reflection layer and the voltage V4 exceeding the lower threshold value of the first selective reflection layer and being less than the lower threshold value of the second selective reflection layer, wherein the first frequency is different than the second frequency, the first step sets the texture of the second selective reflection layer when at steady state, and the second step sets the texture of the first selective reflection layer when at steady state, the second frequency is smaller than the first frequency, and the second frequency is in a range of 0 to 100 Hz.

12. The driving device of a stacked light modulating device as claimed in claim 11, wherein the photoconductor layer comprises an organic photoconductor.

13. The driving device of a stacked light modulating device as claimed in claim 11, wherein the selective reflection layers have a two-layer structure or a three-layer structure.

14. The driving device of a stacked light modulating device as claimed in claim 11, wherein the selective reflection layers each comprises the cholesteric liquid crystal dispersed in a polymer.

* * * * *